US012747975B2

(12) United States Patent
Otsuki et al.

(10) Patent No.: US 12,747,975 B2
(45) Date of Patent: Sep. 29, 2026

(54) CORIOLIS MASS FLOWMETER WITH NO RISK OF METAL ION ELUTION

(71) Applicants: AlphiTechnology Co., LTD., Chiba (JP); KOFLOC CORP., Kyoto (JP)

(72) Inventors: Shinya Otsuki, Chiba (JP); Keiji Kido, Kyoto (JP); Nozomi Kojima, Kyoto (JP); Shunta Furukawa, Kyoto (JP)

(73) Assignees: ALPHITECHNOLOGY CO., LTD., Chiba (JP); KOFLOC CORP., Kyoto (JP)

( * ) Notice: Subject to any disclaimer, the term of this patent is extended or adjusted under 35 U.S.C. 154(b) by 0 days.

(21) Appl. No.: 19/123,125

(22) PCT Filed: Nov. 1, 2023

(86) PCT No.: PCT/JP2023/039373

§ 371 (c)(1),
(2) Date: Apr. 22, 2025

(87) PCT Pub. No.: WO2024/096040

PCT Pub. Date: May 10, 2024

(65) Prior Publication Data

US 2026/0009666 A1 Jan. 8, 2026

(30) Foreign Application Priority Data

Nov. 4, 2022 (JP) ................................ 2022-177594

(51) Int. Cl.
*G01F 1/84* (2006.01)

(52) U.S. Cl.
CPC .......... *G01F 1/8422* (2013.01); *G01F 1/8427* (2013.01)

(58) Field of Classification Search
CPC .... G01F 1/8413; G01F 1/8436; G01F 1/8477; G01F 1/8409; G01F 1/849; G01F 1/8431;
(Continued)

(56) References Cited

U.S. PATENT DOCUMENTS 5,054,326 A 10/1991 Mattar
5,728,952 A 3/1998 Yao et al.
(Continued)

FOREIGN PATENT DOCUMENTS

AU 625788 B2 * 7/1992 ........... G01F 1/8413
JP 58-206926 12/1983
(Continued)

OTHER PUBLICATIONS

Chapter 3: Research on Factors Affecting the Fluid-Structure Interaction Vibration Characteristics of a Double-U-Shaped CMF, Chinese Master's Theses Full-text Database, Engineering Science and Technology II, 2013, pp. 30-51 (with machine translation).
(Continued)

*Primary Examiner* — Andre J Allen
(74) *Attorney, Agent, or Firm* — Wenderoth, Lind & Ponack, L.L.P.

(57) ABSTRACT

A Coriolis mass flowmeter whose targets of measurement include a corrosive fluid and which has no risk of elution of metal ions. The Coriolis mass flowmeter comprises a straight tube through which a fluid to be measured flows; a vibration exciter for exciting the tube to vibrate; a first vibration detector and a second vibration detector for detecting the vibration of the tube; and supports for supporting each end of the tube to serve as fixed ends for the vibration; wherein the vibration exciter, the first vibration detector and the second vibration detector are supported by frames connected to the supports; wherein a mass flow rate of the fluid flowing through the tube is determined based on a phase shift of vibration waveforms detected by the first vibration detector and the second vibration detector. The tube, the supports and the frames are made of a plastic material with high elasticity.

8 Claims, 15 Drawing Sheets

(58) Field of Classification Search

CPC .... G01F 1/8427; G01F 1/8422; G01F 1/8418; G01F 1/84; G01F 15/024; G01F 1/8472; G01F 25/10; G01F 1/8404; G01F 1/8486; G01F 1/8495; G01F 1/74; G01F 1/8445; G01F 15/14; G01F 1/8468; G01F 15/006; G01F 15/02; G01F 1/844; G01F 25/00; G01F 1/845; G01F 1/8481; G01F 15/022; G01F 1/80; G01F 15/185; G01F 1/8454; G01F 15/18; G01F 1/8459; G01F 1/8463; G01F 15/00; G01F 1/76; G01F 5/00; G01F 15/10; G01F 7/00; G01F 1/66; G01F 15/06; G01F 1/00; G01F 1/34; G01F 15/007; G01F 1/58; G01F 15/08; G01F 15/028; G01F 1/78; G01F 1/86; G01F 15/005; G01F 1/662; G01F 25/13; G01F 1/44; G01F 1/72; G01F 15/16; G01F 15/002; G01F 15/003; G01F 15/04; G01F 1/40; G01F 1/36; G01F 1/586; G01F 15/125; G01F 1/666; G01F 1/6965; G01F 25/11; G01F 25/15; G01F 1/48; G01F 1/7082; G01F 9/001; G01F 1/667; G01F 1/88; G01F 25/0092; G01F 15/063; G01F 15/105; G01F 1/32; G01F 1/708; G01F 13/006; G01F 15/001; G01F 1/363; G01F 1/50; G01F 1/712; G01F 25/14; G01F 1/684; G01F 1/6847; G01F 1/90; G01F 1/588; G01F 1/69; G01F 1/7086; G01F 15/046; G01F 15/0755; G01F 15/12; G01F 25/17; G01F 1/002; G01F 1/20; G01F 1/206; G01F 1/3218; G01F 1/3227; G01F 1/37; G01F 1/68; G01F 1/6845; G01F 1/6888; G01F 1/696; G01F 15/061; G01F 15/068; G01F 15/075; G01F 17/00; G01F 23/2966; G01F 23/2968; G01F 25/20; G01F 7/005; G01F 9/008; G01F 9/023

See application file for complete search history.

(56) References Cited

U.S. PATENT DOCUMENTS

| | | | | |
|---|---|---|---|---|
| 5,827,979 | A | 10/1998 | Schott et al. | |
| 6,336,369 | B1 | 1/2002 | Gomi et al. | |
| 6,807,868 | B1 | 10/2004 | Nakao et al. | |
| 7,360,452 | B2 * | 4/2008 | Rieder | G01F 15/14 73/861.355 |
| 7,360,453 | B2 * | 4/2008 | Rieder | G01F 1/8431 73/861.357 |
| 11,391,612 | B2 * | 7/2022 | Chatzikonstantinou | G01F 1/8422 |
| 12,174,212 | B2 * | 12/2024 | Rieder | G01F 1/8495 |
| 2003/0097881 | A1 | 5/2003 | Schlosser et al. | |
| 2007/0186686 | A1 | 8/2007 | Drahm et al. | |
| 2009/0173167 | A1 | 7/2009 | Takayanagi | |
| 2011/0000315 | A1 | 1/2011 | Tsubota et al. | |
| 2015/0053021 | A1 | 2/2015 | Young | |
| 2017/0082765 | A1 | 3/2017 | Xia et al. | |
| 2021/0333136 | A1 | 10/2021 | Mahalingam et al. | |
| 2022/0099543 | A1 | 3/2022 | Rieder et al. | |
| 2022/0139199 | A1 | 5/2022 | Miwa | |

FOREIGN PATENT DOCUMENTS

| | | | | |
|---|---|---|---|---|
| JP | 64-15921 | | 1/1989 | |
| JP | 2003177048 | A * | 6/2003 | |
| JP | 2003-525437 | | 8/2003 | |
| JP | 2005-106575 | | 4/2005 | |
| JP | 2005-510701 | | 4/2005 | |
| JP | 2005-510703 | | 4/2005 | |
| JP | 3656947 | | 6/2005 | |
| JP | 5086814 | | 11/2012 | |
| JP | 5582737 | | 9/2014 | |
| JP | 5602884 | | 10/2014 | |
| JP | 2016-528513 | | 9/2016 | |
| JP | 6257772 | | 1/2018 | |
| JP | 6581309 | | 9/2019 | |
| WO | 03/046488 | | 6/2003 | |
| WO | WO-2007074055 | A1 * | 7/2007 | G01F 1/8436 |
| WO | 2011/099989 | | 8/2011 | |
| WO | 2015/026927 | | 2/2015 | |
| WO | 2017/091608 | | 6/2017 | |

OTHER PUBLICATIONS

International Search Report issued Jan. 23, 2024 in corresponding International Application No. PCT/JP2023/039373.

Notice of Reasons for Refusal issued Jan. 23, 2024 in corresponding Japanese Application No. 2023-571718 (with English translation).

Decision to Grant a Patent issued Jun. 4, 2024 in corresponding Japanese Application No. 2023-571718 (with English translation).

Extended European Search Report issued Mar. 6, 2026 in European Patent Application No. 23885794.0.

English Translation of International Preliminary Report on Patentability issued Apr. 29, 2025 in International (PCT) Application No. PCT/JP2023/039373.

* cited by examiner

CORIOLIS MASS FLOWMETER WITH NO RISK OF METAL ION ELUTION

TECHNICAL FIELD

The present invention relates to a Coriolis mass flowmeter for measuring the mass flow rate of a fluid by detecting torsional vibration due to the effect of a Coriolis force exerted by the fluid in a vibrating flow path.

BACKGROUND ART

Coriolis mass flowmeters have been conventionally used for directly measuring a mass flow rate. When a fluid flowing through a tube generates a rotary motion, the fluid receives a Coriolis force, which is proportional to the vector product of the velocity vector of the flow and the angular velocity vector of the rotation. Coriolis mass flowmeters utilize the principle that the Coriolis force is proportional to a mass flow rate. Coriolis mass flowmeters typically operate by vibrating a tube through which a fluid passes, and detecting the elastic deformation of the tube due to the effect of the Coriolis force of the fluid.

Coriolis mass flowmeters determine a mass flow rate by using a vibration exciter to forcibly excite the vibration of a tube through which a fluid to be measured passes, and detecting the phase difference of vibration occurring between the upstream and downstream points of the flow path due to the mass flow rate of the fluid. To generate vibration efficiently, Coriolis mass flowmeters typically excite the vibration at the natural frequency of vibration of a tube through which a fluid passes. The major factors that determine the natural frequency of vibration of the tube are the modulus of elasticity (modulus of longitudinal elasticity) of the material of the tube and the shape of the tube. A metal tube is often used as a tube of a Coriolis mass flowmeter because a metal tube is capable of maintaining a relatively stable modulus of elasticity under varying temperatures, and its shape is resistant to deformation over time.

Among such types of flowmeters, Coriolis mass flowmeters that can be used for the measurement of a fluid corrosive to metals are known in the prior art. For example, a Coriolis mass flowmeter resistant to a corrosive fluid as shown in FIG. 2A is known, which comprises a U-shaped curved composite tube 21 attached to a supporting member 23 by fastening portions 22, wherein the U-shaped curved composite tube 21 is excited to vibrate at its natural frequency of vibration, wherein the U-shaped curved composite tube 21 has a double structure in which the outer face is made of an elinvar alloy 24, and the inner face 25 is coated with a fluororesin, as shown in FIG. 2B (Patent Literature 1). However, coating a fluororesin on the bent part of the U-shaped tube of the Coriolis mass flowmeter is difficult.

Fluororesin coating is also difficult to thicken. If the coating is not properly applied, there would be a concern about the elution of metal ions into a fluid. Due to these reasons, refraining from using a metal as a material for the tube is recommended. Accordingly, a Coriolis mass flowmeter having a tube made of perfluoroalkoxyalkane (PFA), as shown in FIG. 3, has been proposed (Patent Literature 2). As shown in FIG. 3, a fluid as a process material is fed from a feed tube 31, and the fluid is supplied to a tube 33 through a process connection portion 32. The tube 33 is excited to vibrate at a frequency resonant with the flow of the fluid by a vibration exciter 34. The fluid in the tube 33 is then sequentially passed through a process connection portion 35, a tube 36 for correcting the flow direction of the fluid, a process connection portion 37, a return tube 38, a process connection portion 39, and an outlet tube 40. The tube 33 and the return tube 38 are made of PFA. However, when the tubes are made exclusively of a fluororesin, there would be concerns about a change in the modulus of elasticity with temperature or time-dependent creep of the tubes. Based on the principle, a Coriolis mass flowmeter measures a flow rate by exciting the vibration of a tube, but a change in the modulus of elasticity of the tube will affect the vibration, which will also affect the accurate measurement of the mass flow rate.

A Coriolis mass flowmeter as shown in FIG. 4 has been proposed, which comprises a sub-assembly structure made of an elastic polymer material having two flow rate detection members each having one or more linear portions and being connected to each other at the bottom (Patent Literature 3). A solid sub-assembly 51 shown in FIG. 4 is made of a polymer material, and is produced from a single block of an elastic polymer by CNC processing. The sub-assembly 51 has flow paths 52, 53 each extending entirely from one end to another longitudinally along the central axis of a U-shaped member. Flow paths 54, 55, 56, 57 each are formed to completely penetrate through a support member 58 along the central axis of the U-shaped member. A Coriolis mass flowmeter produced from a single polymer material, as shown in FIGS. 5 and 6, has also been proposed, which comprises a body 61; at least four tubular port extensions 62A, 62B, 62C, 62D that are integrated with the body 61 and each includes a weld surface; manifold flow passageways 63A, 63B, 63C, 63D; isolation plates 64A, 64B, 64C, 64D that are integrated with the body 61 and the at least four tubular port extensions; and two flow-sensitive members 65A, 65B each having two open ends (Patent Literature 4). A Coriolis mass flowmeter as shown in FIG. 7 has also been proposed, which comprises flow-sensitive members 71A, 71B, and dynamically responsive supports 72 for supporting the flow-sensitive members 71A, 71B (Patent Literature 5). The flow-sensitive members are made of a fluororesin, such as PFA, polyether ether ketone (PEEK), polyvinylidene difluoride (PVDF), polytetrafluoroethylene (PTFE), etc. The coefficient of thermal expansion of the material of the supports is close to or smaller than that of the fluororesin.

The Coriolis mass flowmeters disclosed in Patent Literatures 3 to 5 are, however, incapable of responding to a change in the modulus of elasticity with temperature. In other words, the spring constant (proportional to the Young's modulus) of the material of the tube(s) changes with temperature, and will directly affect the precision of the Coriolis mass flowmeters. The temperature of flow rate sensing elements changes with a change in the temperature of the fluid and/or the environment. Therefore, temperature compensation is required to maintain the precision of the measurement of a flow rate with a Coriolis mass flowmeter. Data of the temperature-dependent Young's modulus of almost all metal alloys (such as stainless steel or titanium) that are used to produce conventional Coriolis mass flowmeters are available from NIST (or other technical materials). However, regarding elastic polymers, such specific data (such as a temperature-dependent modulus of elasticity) are usually not available, or only some temperature-dependent data are described in publications. When the production of a Coriolis mass flowmeter using a plastic is described in the conventional art, there is a mention of a means for detecting the temperature of flow rate sensing elements, but there is no mention of how to achieve effective temperature compensation for a specific elastic polymer material over the range of operative temperature. Importantly, without such temperature compensation, Coriolis mass flowmeters cannot be used in an application in which the temperature of a sensor is substantially different from the temperature at the time of calibration.

To obtain a Coriolis mass flowmeter with high sensitivity that can be used for the measurement of a fluid with a very small flow rate, the distance between two vibration detectors is required to be as large as possible, and the torsional spring constant of a tube is required to be small so that torsional behavior can be easily observed.

For example, Patent Literature 6 proposes a Coriolis mass flowmeter comprising a tube through which a fluid flows, the tube comprising an inner tube 82 that is in contact with a flow path 81, and an outer tube 83 stacked on an outer peripheral surface of the inner tube 82, as shown in FIG. 8. The inner tube 82 is made of a fluororesin. The outer tube 83 is made of a prepreg that comprises glass fibers embedded in an uncured epoxy resin and is wound around the outer circumference of the inner tube 82 and then cured. The outer tube 83 has a modulus of elasticity that is higher than that of the inner tube 82.

The outer tube 83 comprises fibers F1 and F2 arrayed on the outer peripheral surface 84 of the inner tube 82, and a resin 85 for attaching the fibers F1 and F2 to the inner tube 82 or for pressing and fixing the fibers F1 and F2 on the inner tube 82. Patent Literature 7 proposes a Coriolis mass flowmeter, as shown in FIG. 9, comprising a frame comprising a mainframe 91 and a subframe 92, an outer case 93, and a vibrating tube 94, wherein the vibrating tube 94 has a measuring portion made of a carbon fiber reinforced fluororesin, wherein the vibrating tube has a feeding and discarding portion for receiving and discharging a fluid, and wherein inlet and outlet portions of the feeding and discarding portion are made of a non-fiber reinforced fluororesin.

When the mass flow rate of a fluid having a very small flow rate is measured with high precision using a Coriolis mass flowmeter, the distance (d) between two vibration detectors is required to be as large as possible, and the torsional spring constant (Kθ) of the tube is required to be small, as described above.

However, in cases of a conventional U-shaped tube, when the distance d is large, the moment of inertia in the direction of torsion and the torsional spring constant KO are large, resulting in a small torsional vibration frequency (Coriolis vibration frequency). When the Coriolis vibration frequency is small, the measurement of a mass flow rate will be easily affected by external vibration noise. Also, when the distance d is large, the pressure loss of a fluid is large, and as a result, not only the maximum flow rate is restricted but also part of a fluid flowing through a tube is not discharged and remains within the tube. Such a remaining fluid is difficult to completely remove from the tube to clean the inside of the tube, even when cleaning in place or disinfection in place is performed, especially in a manufacturing process, such as chipmaking processes or pharmaceutical manufacturing processes, that requires very high cleanliness of manufacturing facilities.

To reduce the torsional spring constant Kθ of a tube as much as possible, the flexural rigidity (EI) (E: modulus of elasticity, I: second moment of inertia of area) should be reduced as much as possible. This means that the tube should be narrow and the wall thickness of the tube should be as thin as possible. Such a tube satisfies the purpose of measuring the flow rate of a fluid having a very small flow rate, but when the tube is narrow, the pressure loss will be large.

Even when the tube having a double structure in which the outer tube covering the outer peripheral surface of the inner tube is made of a fiber-reinforced resin with a high modulus of elasticity (as disclosed in Patent Literature 6) has a small inner diameter, the wall thickness of the tube will still be large. Therefore, there is a limitation in reducing the torsional spring constant Kθ, which limits the improvement of the sensitivity of measuring the very small flow rate of a fluid with high precision.

The Coriolis mass flowmeters disclosed in Patent Literatures 2 and 5 have tubes made of a fluororesin. The density of a fluororesin is lower than that of a metal. Thus, if the size of a fluororesin tube is equal to the size of a metal tube, the mass of the fluororesin tube will be smaller than that of the metal tube. Since a pair of a coil and a magnet is often used as a vibration exciter and two vibration detectors loaded on a tube, relatively heavy mass is concentrated on an elastic polymer, such as a fluororesin. Such a concentrated mass applied to a tube may affect the measurement of the density of a fluid, and may reduce the sensitivity and precision of the measurement. Patent Literature 5 describes, in paragraph 0029, that "other types of motion sensors, such as a photo sensor, can also be used." However, this statement merely exemplifies different types of motion sensors, and does not explain that a concentrated mass applied to a tube may affect the measurement of the density of a fluid.

Patent Literature 8 is intended to provide a Coriolis mass flowmeter comprising two parallel arcuate tubes, which is less susceptible to disturbance vibration, has few installation requirements, has less tube stress, and has little heat influence. The proposed Coriolis mass flowmeter, as shown in FIG. 10, comprises two arcuate flow tubes 101, 102; an inlet manifold and an outlet manifold 103 to which each end of the flow tubes is connected by welding; a drive device 104 for driving the flow tubes at resonance so that one flow tube is vibrated at an opposite phase relative to that of the other flow tube; and a pair of vibration detecting sensors 105, 106 for detecting a phase difference proportional to the Coriolis force, the vibration detecting sensors being disposed symmetrically on the left and right sides about the attaching position of the drive device 104.

However, Patent Literature 8 and Patent Literatures 1 to 7 include no reference to the measurement of the density of a fluid.

Patent Literature 9 discloses a double straight tube-type Coriolis flowmeter. As shown in FIG. 11, the double straight tube-type Coriolis flowmeter comprises a hollow cylindrical outer case 112 having connecting flanges 111 at both ends; a straight flow tube 113 through which a fluid to be measured flows, the flow tube 113 being disposed in the outer case 112 so that the flow tube 113 shares the same axis with the outer case 112; a hollow cylindrical outer tube 115 concentrically secured to the outside of the flow tube 113 at both ends via coupling plates 114 so that concentric double tubes are formed; a counterweight 116 attached to the center of the outer tube 115; and a drive unit 117 disposed on the outer tube 115. The flow tube 113 is excited to vibrate at its first natural mode of vibration. When the fluid flows, Coriolis forces are generated in opposite directions in the inflow and outflow sides, and the central portion, at which the vibration speed becomes maximum, serves as the boundary of the Coriolis forces, resulting in deflection of the flow tube 113 in an undulated manner. This undulated deflection is called the secondary-mode component. The flow tube 113 is thus subjected to displacement as a result of the superposition of the first mode vibration due to the vibration caused by the drive unit and the secondary mode vibration due to the Coriolis forces. A pair of sensors 118 are installed on the outer tube 115 at positions on both sides of the drive unit 117 at which the secondary-mode component becomes maximum, so that the phase difference of the flow tube 113 due to the Coriolis forces is detected to determine the mass flow of the fluid being measured.

However, in the double straight tube-type Coriolis flowmeter disclosed in Patent Literature 9, when the temperature of a fluid to be measured changes and a very large temperature difference occurs between the flow tube and the outer tube, stress is generated in the longitudinal direction, and the natural frequency of vibration of the tube changes with a change in the spring constant due to thermal stress. As a result, the energy balance collapses and resonance drive is difficult to achieve.

CITATION LIST

Patent Literature

Patent Literature 1: JP S64-15921 U
Patent Literature 2: JP 2005-510703 A
Patent Literature 3: JP Pat. No. 5602884
Patent Literature 4: JP Pat. No. 6257772
Patent Literature 5: JP Pat. No. 6581309
Patent Literature 6: JP Pat. No. 5086814
Patent Literature 7: JP Pat. No. 5582737
Patent Literature 8: JP Pat. No. 3656947
Patent Literature 9: U.S. Pat. No. 6336369

SUMMARY OF INVENTION

Technical Problem

The present invention was made to solve the above problems associated with conventional techniques. An object of the present invention is to provide a Coriolis mass flowmeter whose targets of measurement include a corrosive fluid and which has no risk of elution of metal ions. Another object of the present invention is to provide a Coriolis mass flowmeter that has a tube reducible in its diameter and that enables stable measurement under varying temperatures. A further object of the present invention is to provide a Coriolis mass flowmeter that is less influenced by external vibration and that enables measurement of a low-density fluid with high sensitivity. A further object of the present invention is to provide a Coriolis mass flowmeter that, even when miniaturized, is capable of measuring the mass flow rate and density of a fluid having a very small flow rate with high sensitivity. A further object of the present invention is to provide a Coriolis mass flowmeter that is less influenced by vibration noises or the viscosity of a fluid to be measured.

Solution To Problem

The inventors conducted extensive research to solve the above problems, and found that the problems are solved by the following means.

(1) A first aspect of the present invention is a Coriolis mass flowmeter comprising
a straight tube through which a fluid to be measured flows;
a vibration exciter for exciting the tube to vibrate;
first and second vibration detectors for detecting the vibration of the tube; and
supports for supporting each end of the tube to serve as fixed ends for the vibration;
wherein the vibration exciter and the first and second vibration detectors are supported by a frame connected to the supports;
wherein a mass flow rate of the fluid flowing through the tube is determined based on a phase shift of vibration waveforms detected by the first and second vibration detectors; and
wherein the tube, the supports and the frame are made of a plastic material with high elasticity.

(2) A second aspect of the present invention is the Coriolis mass flowmeter according to the above (1), wherein the plastic material with high elasticity is a carbon fiber reinforced thermoplastic (CFRTP).

(3) A third aspect of the present invention is the Coriolis mass flowmeter according to the above (2), wherein the thermoplastic is a fluororesin.

(4) A fourth aspect of the present invention is the Coriolis mass flowmeter according to any one of the above (1) to (3), wherein when the first vibration detector has a mass m1, the second vibration detector has a mass m2, and the vibration exciter has a mass m3, m3 is larger than a total mass of m1 and m2.

(5) A fifth aspect of the present invention is the Coriolis mass flowmeter according to any one of the above (1) to (3), wherein when M=Mt+m+Mf is established, m=0.4M or less, wherein the first vibration detector has a mass m1, the second vibration detector has a mass m2, the vibration exciter has a mass m3, m is a total mass of m1 and m2 and m3, the tube has a mass Mt, and the fluid flowing the tube has a mass Mf.

(6) A sixth aspect of the present invention is the Coriolis mass flowmeter according to any one of the above (1) to (3), wherein the first and second vibration detectors are acceleration sensors arranged symmetrically about the vibration exciter.

(7) A seventh aspect of the present invention is the Coriolis mass flowmeter according to any one of the above (1) to (3), wherein the first and second vibration detectors are acoustic sensors arranged symmetrically about the vibration exciter.

(8) An eighth aspect of the present invention is the Coriolis mass flowmeter according to any one of the above (1) to (3), wherein the vibration exciter is a piezoelectric element.

(9) A ninth aspect of the present invention is a Coriolis mass flowmeter comprising
a straight tube through which a fluid to be measured flows;
a vibration exciter for exciting the tube to vibrate;
first and second vibration detectors for detecting the vibration of the tube; and
left and right supports for supporting each end of the tube to serve as fixed ends for the vibration;
wherein the vibration exciter and the first and second vibration detectors are supported by at least one of first and second frames connected to the supports;
wherein a mass flow rate of the fluid flowing through the tube is determined based on a phase shift of vibration waveforms detected by the first and second vibration detectors;
wherein the tube is a single straight tube;
wherein the first and second frames are arranged symmetrically about the longitudinal axis of the tube;
wherein the vibration exciter is located at a center of the first frame, wherein the center is at an equal distance from the left and right supports;
wherein the first and second vibration detectors are located on the first frame and are arranged symmetrically about the vibration exciter; and
wherein an additional first vibration detector and an additional second vibration detector are supported by the second frame so that the additional first and second vibration detectors are arranged symmetrically to the first and second vibration detectors supported by the first frame about the longitudinal axis of the tube.

(10) A tenth aspect of the present invention is the Coriolis mass flowmeter according to the above (9), wherein the Coriolis mass flowmeter further comprises
a differential circuit for computing a difference between outputs from the first vibration detectors, and
a differential circuit for computing a difference between outputs from the second vibration detectors,
wherein a phase difference between outputs from the differential circuits is measured to reject a common mode signal.

(11) An eleventh aspect of the present invention is the Coriolis mass flowmeter according to the above (10), wherein the first and second vibration detectors are capacitive sensors, and wherein a metallic thin film is attached to the tube.

(12) A twelfth aspect of the present invention is the Coriolis mass flowmeter according to any one of the above (9) to (11), wherein the first and second vibration detectors are optical displacement sensors, and wherein a metallic thin film is attached to the tube.

(13) A thirteenth aspect of the present invention is the Coriolis mass flowmeter according to any one of the above (9) to (11), wherein the vibration exciter is composed of a magnetic body such as a permanent magnet and an electromagnetic driving coil corresponding to the magnetic body; the magnetic body is supported by the tube and serves as a vibration exciter for exciting the tube to vibrate; and a non-magnetic body having a shape and a mass identical to those of the magnetic body is supported by the tube so that the non-magnetic body is arranged symmetrically to the magnetic body about the longitudinal axis of the tube.

(14) A fourteenth aspect of the present invention is the Coriolis mass flowmeter according to the above (13), wherein when the first vibration detectors have a mass m1, the second vibration detectors have a mass m2, and the vibration exciter has a mass m3, m3 is larger than a total mass of m1 and m2; wherein the first vibration detector supported by the first frame and the additional first vibration detector supported by the second frame each have a mass of m1/2; wherein the second vibration detector supported by the first frame and the additional second vibration detector supported by the second frame each have a mass of m2/2; and wherein the magnetic body and the non-magnetic body each have a mass of m3/2.

Advantageous Effects Of Invention

The carbon fiber reinforced thermoplastic used to form the tube, the supports and the frame may be a carbon fiber reinforced fluororesin. A carbon fiber reinforced fluororesin has an elastic modulus in bending of about 32 GPa, which is about 17% of the modulus of longitudinal elasticity (193 GPa) of stainless steel (SUS304). The coefficient of linear expansion ($10^{-6}$/°C) of a carbon fiber reinforced fluororesin is about zero, whereas the coefficient of linear expansion ($10^{-6}$/°C) of stainless steel (SUS304) is 16.Therefore, the tube, the supports and the frame made of a carbon fiber reinforced fluororesin are resistant to dimensional changes due to temperature and to chemicals.

The density of a fluid is determined by measuring a change in the Coriolis vibration frequency corresponding to a change in the density of the fluid. When the total mass of the vibration detectors that detect vibration is larger than the mass of the tube to some extent, the gradient of the change in the Coriolis vibration frequency becomes small, and the amount of the change in the Coriolis vibration frequency becomes small relative to the amount of the change in the density of the fluid, resulting in a reduction in the detection sensitivity. Accordingly, the sensitivity of detecting the density of a fluid can be increased by setting the following parameters: when the first vibration detector has a mass m1, the second vibration detector has a mass m2, and the vibration exciter has a mass m3, m3 is larger than a total mass of m1 and m2; and when M=Mt+m+Mf is established, m=0.4M or less, wherein m is a total mass of m1 and m2 and m3, the tube has a mass Mt, and the fluid flowing the tube has a mass Mf.

BRIEF DESCRIPTION OF DRAWINGS

FIG. 12A shows that a tube filled with a fluid flowing at a flow velocity of v=0 is vibrated by a vibration exciter. FIG. 12B shows that torsional vibration occurs when a fluid is flowing through a tube at a flow velocity v (≠0).

DESCRIPTION OF EMBODIMENTS

Figure 1:
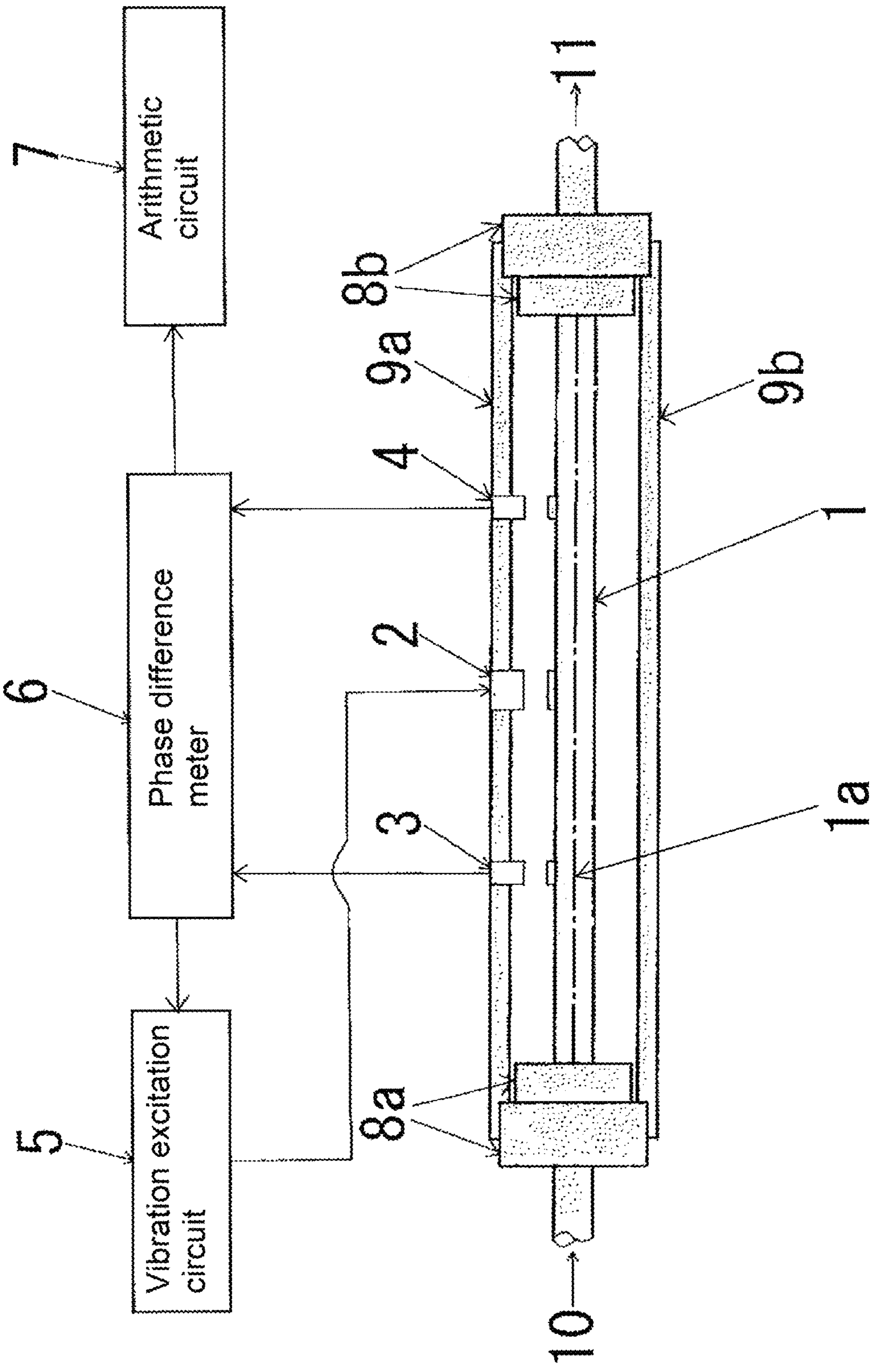
FIG. 1 is a schematic configuration diagram of a first example of the Coriolis mass flowmeter of the present invention including related components.
Figure 2:
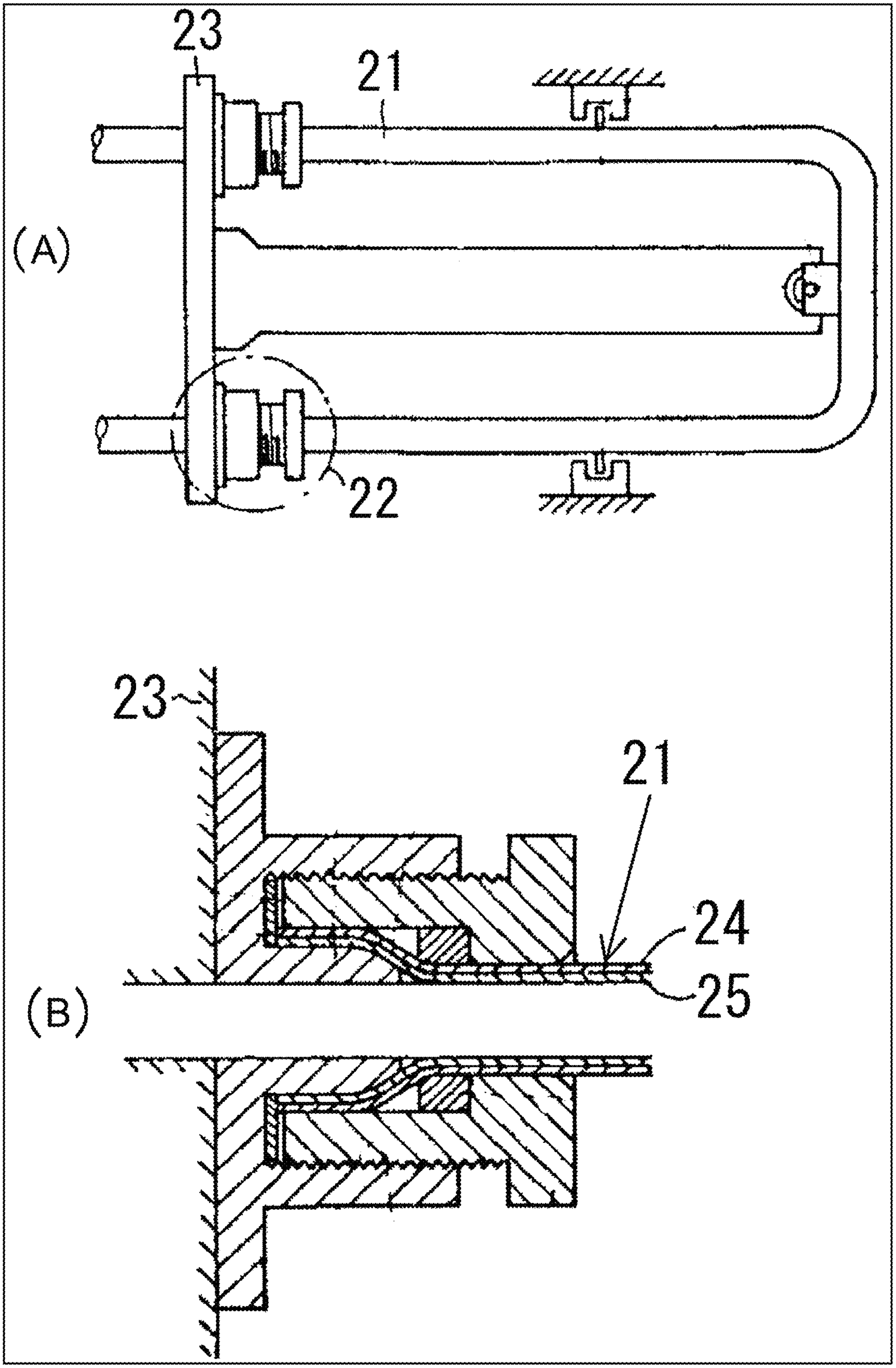
FIG. 2A is a schematic configuration diagram of a Coriolis mass flowmeter disclosed in Patent Literature 1.
FIG. 2B is an enlarged sectional view of a fastening portion of the Coriolis mass flowmeter.
Figure 3:
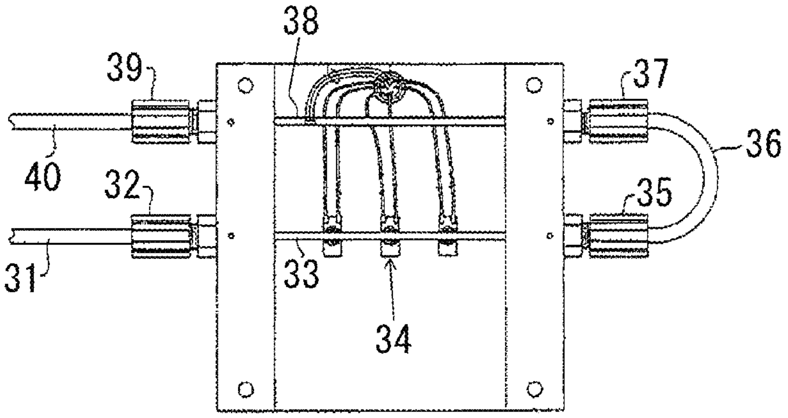
FIG. 3 is a plan view of a Coriolis mass flowmeter disclosed in Patent Literature 2.
Figure 4:
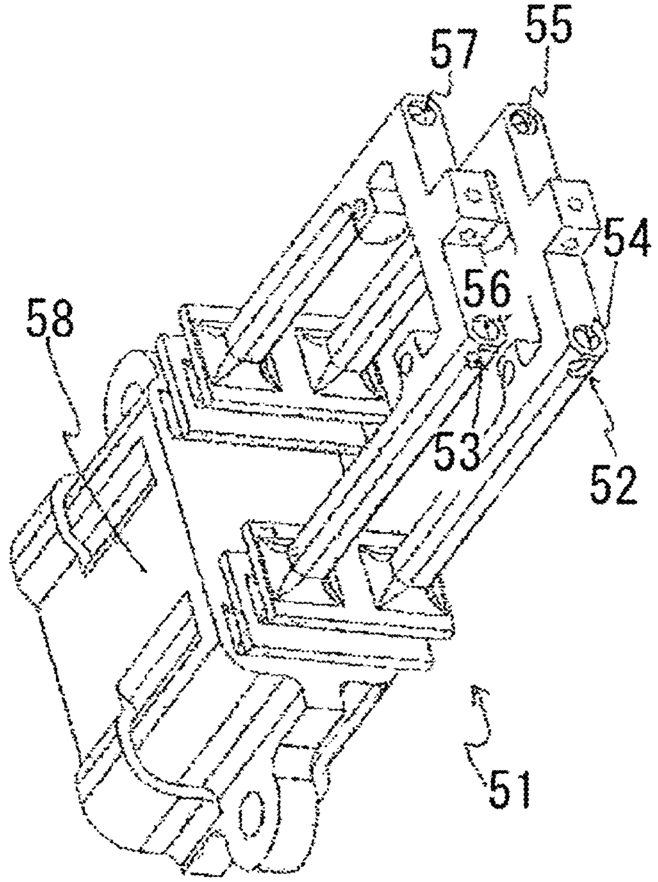
FIG. 4 is a diagram showing a schematic configuration of a Coriolis mass flowmeter disclosed in Patent Literature 3.
Figure 5:
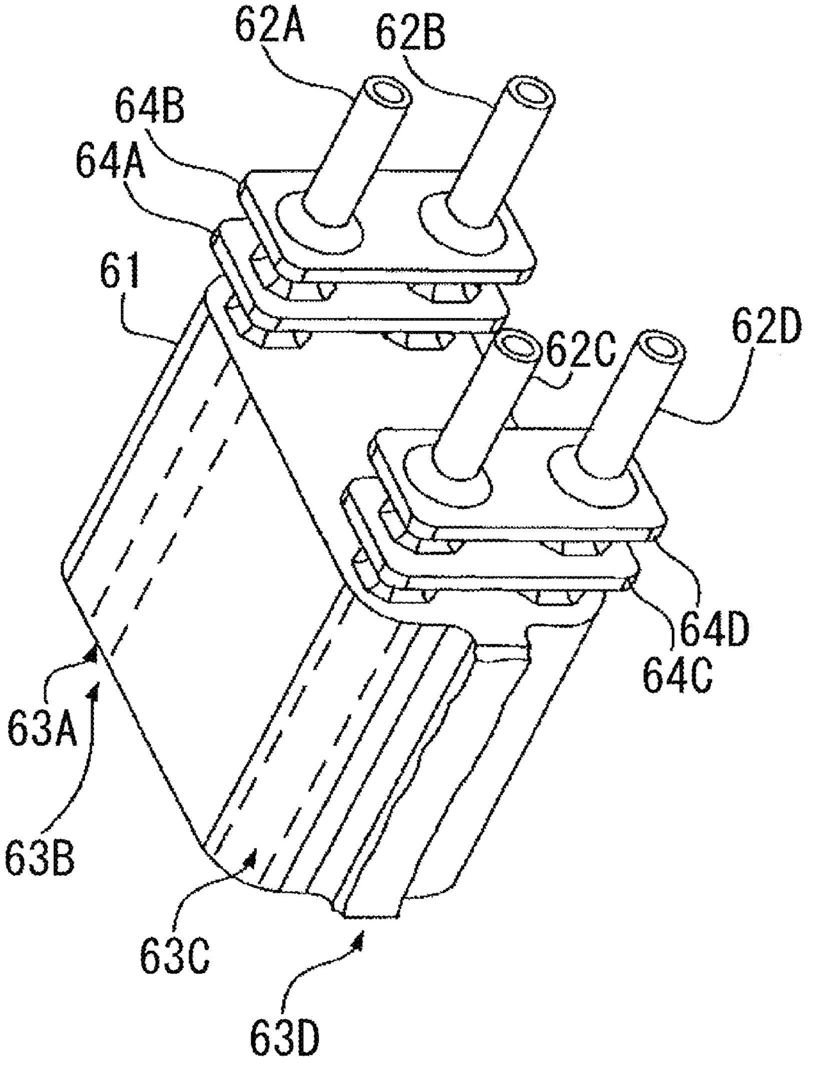
FIG. 5 is a diagram showing a schematic configuration of a body, tubular port extensions, manifold flow passageways, and isolation plates of a Coriolis mass flowmeter disclosed in Patent Literature 4.
Figure 6:
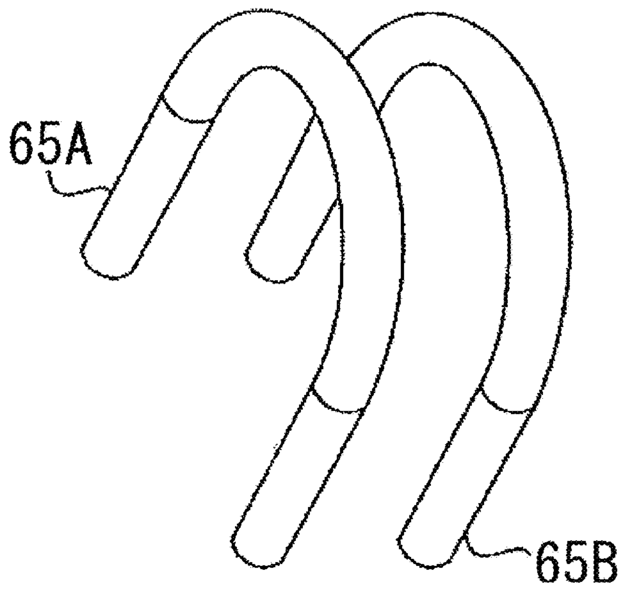
FIG. 6 is a diagram showing a schematic configuration of flow sensing members of the Coriolis mass flowmeter disclosed in Patent Literature 4.
Figure 7:
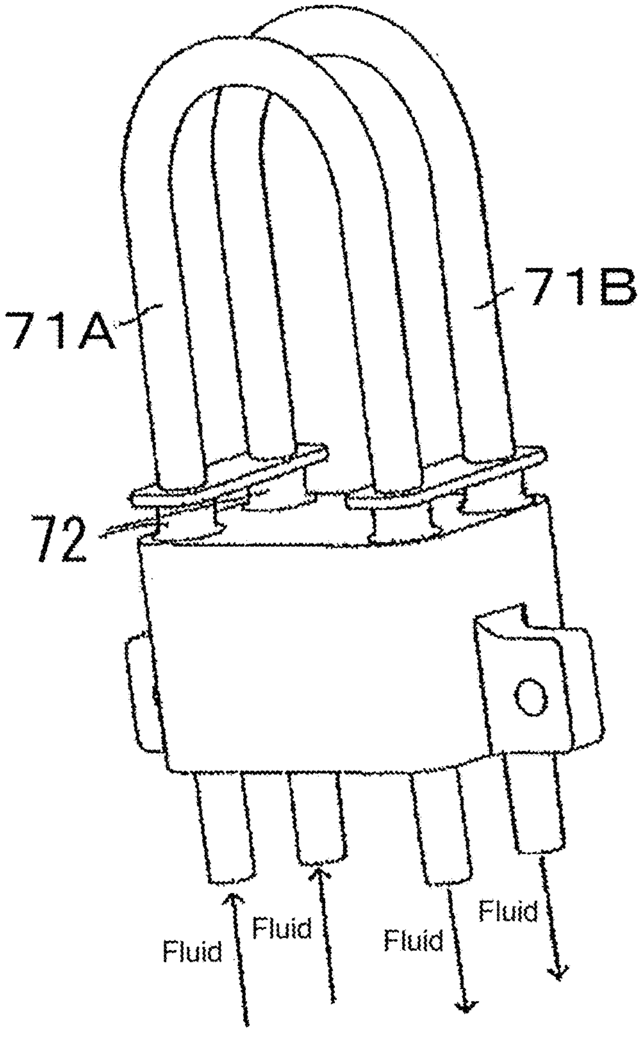
FIG. 7 is a diagram showing a schematic configuration of a Coriolis mass flowmeter disclosed in Patent Literature 5.
Figure 8:
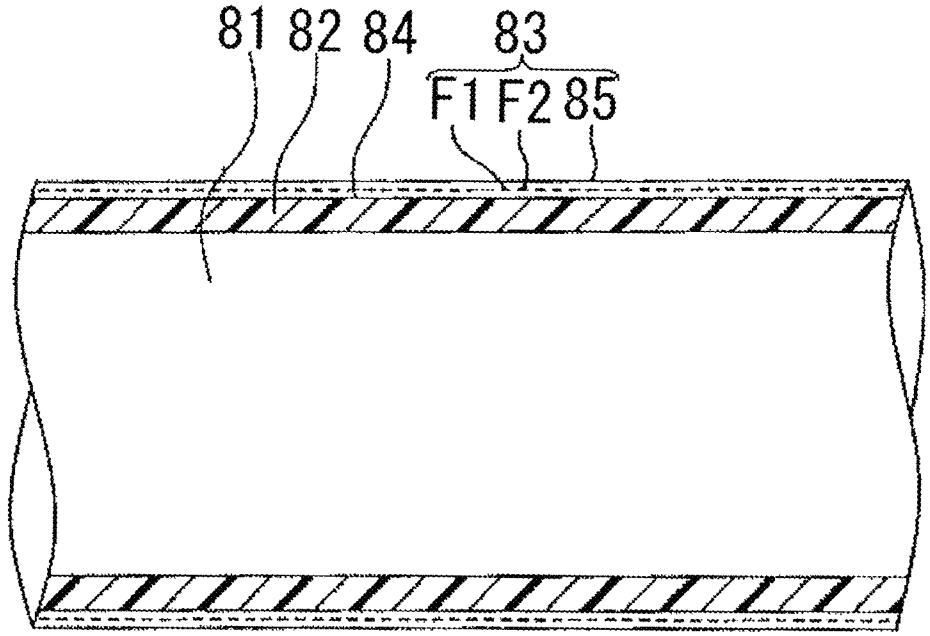
FIG. 8 is an enlarged sectional view of a tube of a Coriolis mass flowmeter disclosed in Patent Literature 6.
Figure 9:
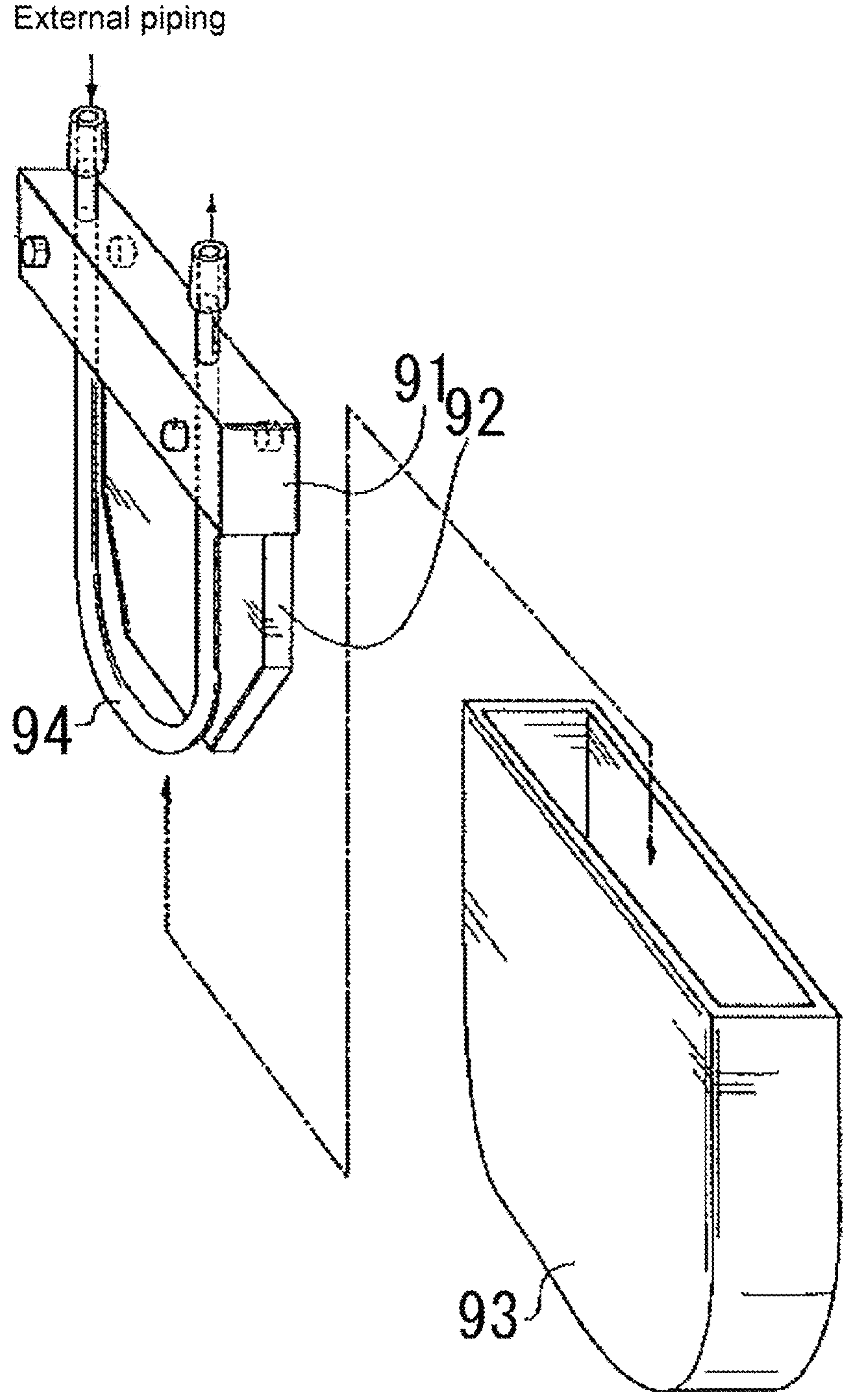
FIG. 9 is a diagram showing a schematic configuration of a Coriolis mass flowmeter disclosed in Patent Literature 7.
Figure 10:
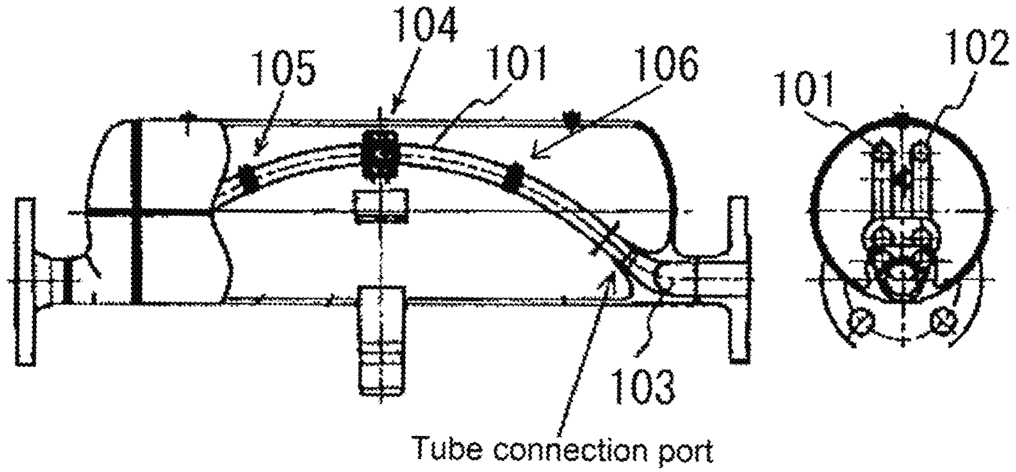
FIG. 10 is a diagram showing a partial section of a Coriolis mass flowmeter disclosed in Patent Literature 8, and a cross section of a manifold thereof.
Figure 11:
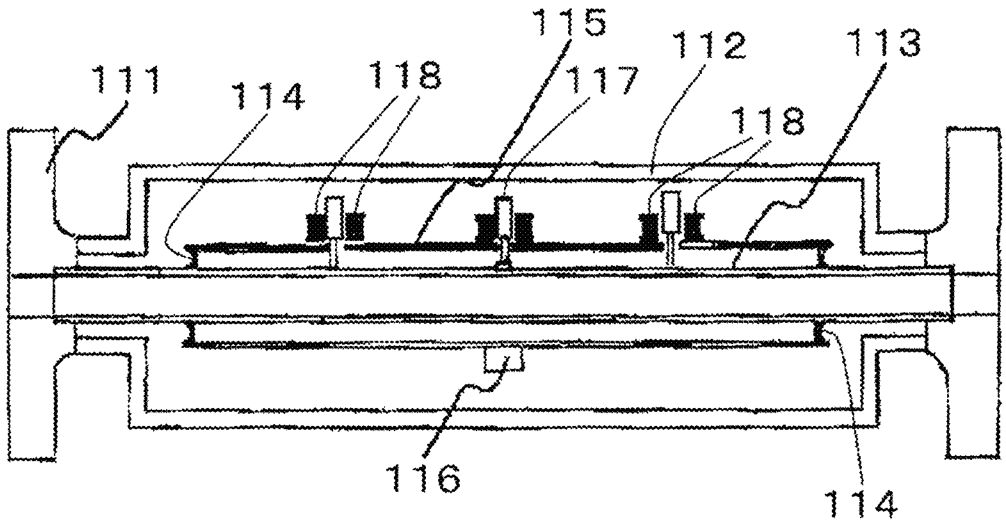
FIG. 11 is a schematic diagram of a double straight tube-type Coriolis flowmeter disclosed in Patent Literature 9.

Specific embodiments of the present invention will be described below, but the present invention is not limited to these embodiments. Various modifications and alterations are possible without departing from the technical scope of the present invention.

Among various types of fluororesins, the fluororesin used in the present invention is preferably a fluororesin that can be subjected to melt molding. Examples of such a fluororesin include perfluoroalkoxyalkane (PFA), perfluoroethylene-propene copolymer (FEP), ethylene-tetrafluoroethylene copolymer (ETFE), ethylene-chlorotrifluoroethylene copolymer (ECTFE), poly (vinylidene fluoride) (PVDF), polychlorotrifluoroethylene (PCTFE), etc.

The carbon fibers that can be used in the present invention include, for example, PAN-based carbon fibers made from polyacrylonitrile fibers; pitch-based carbon fibers made from coal tar or petroleum pitch (available in various types depending on the internal structure, including isotropic pitch-based carbon fibers, mesophase pitch-based carbon fibers, etc.); cellulose-based carbon fibers made from viscose rayon, cellulose acetate, etc.; vapor growth carbon fibers made from hydrocarbons etc.; etc. The carbon fibers used in the present invention may be graphite fibers thereof. The carbon fibers used in the present invention may also be metal-coated carbon fibers produced by coating the above carbon fibers with at least one or more layers of a metal, such as nickel, ytterbium, gold, silver, or copper by plating (electrolytic plating or non-electrolytic plating), the CVD method, the PVD method, ion plating, vacuum deposition, etc. Two or more types of these fibers may be blended to form carbon fibers.

The tube, the supports and the frame in the present invention are preferably made of a carbon fiber reinforced fluororesin, and may further contain an additive other than the fluororesin or the carbon fibers to the extent that the effects of the present invention are not hindered. Examples of such an additive include flame retardants, conductive agents, nucleating agents, ultraviolet absorbers, antioxidants, vibration damping agents, antibacterial agents, insecticides, deodorants, coloration inhibitors, thermostabilizers, mold releasing agents, anti-static agents, plasticizers, lubricants, colorants, pigments, dyes, foaming agents, defoaming agents, coupling agents, etc. Two or more types of them may be used.

The tube, the supports and the frame of the present invention are preferably formed by injection molding. Injection molding has a short cycle time and is capable of molding a complicated shape, and thus has high productivity and can achieve a cost reduction.

When the tube, the supports and the frame in the present invention are fabricated by injection molding, the injection molding is preferably performed under the following conditions. A screw used for the injection molding typically consists of a feed zone, a compression zone and a metering zone. A full-flight screw, which can achieve the smallest degree of kneading, is preferred, but a kneading section may be partially integrated into the screw to adjust the degree of kneading. Fiber breakage during injection molding can be prevented by using a screw with the smallest possible length of a kneading section. The clearance of the cylinder and the screw also greatly affect the fiber length. Light kneading can also be achieved by increasing the clearance, thereby preventing fiber breakage. The nozzle diameter also affects the fiber length. When the nozzle diameter is small, high shearing force is applied to the molten molding material during the passage of the material, which may cause fiber breakage. The fiber length can be made longer by increasing the nozzle diameter. Shear breakage of fibers can also be prevented by increasing the size of the runners in the mold, thereby producing long fibers. By employing hot runner technology, and/or adjusting the temperature control of the mold as appropriate, the viscosity of the fluid resin can be reduced, thereby preventing fiber breakage.

Molding conditions are preferably adjusted as follows: the cylinder temperature is increased to the extent that a matrix resin is not degraded; the rotational speed of the screw is reduced; the metering time is shortened; and the back pressure is lowered. By increasing the cylinder temperature, the viscosity of the molten resin is decreased and the shearing force applied on the fibers is decreased, thereby preventing the breakage of fibers. By setting a low rotational speed of the screw, a short metering time, and a low back pressure, kneading and shearing during molding can be reduced as much as possible, thereby producing a high-strength molded product with a long fiber length and low anisotropy. Low strength anisotropy of the resulting molded product is probably because of the following mechanism. When the fibers are some long lengths (1 mm or more), the fibers inside the molded product are oriented in the vertical direction opposing the resin flow, whereas the fibers on the product's surface, which is instantly cooled and solidified by the mold, are oriented in the direction of resin flow. Consequently, the fibers are strengthened not in one direction but in both directions, and the anisotropy of the resulting molded product is reduced.

The volumetric amount of the carbon fibers in the carbon fiber reinforced thermoplastic in the present invention is preferably 20 to 40%, and more preferably 25 to 35%.

EXAMPLES

The present invention will be described in more detail below with reference to Examples, but is not limited thereto. Various modifications and alterations are possible without departing from the technical scope of the present invention.

Continuous carbon fiber bundles manufactured by Mitsubishi Chemical Group Corporation were cut into 6 mm lengths. The chopped fiber bundles were sufficiently dried to a moisture content of 0.05% or less, and fed to the side hopper of a twin screw extruder manufactured by Shibaura Machine Co., Ltd. (screw diameter: 30 mm, die diameter: 5 mm, barrel temperature: 280 °C, and rotational speed: 150 rpm). A highly flowable, fully fluorinated resin PFA AP-201SH manufactured by Daikin Industries, Ltd. was fed to the main hopper of the twin screw extruder as a thermoplastic resin. The resins were sufficiently kneaded and gut filaments containing discontinuous carbon fibers were continuously extruded. The gut filaments were cooled and cut into 5 mm lengths with a cutter to give a short carbon fiber molding material.

The molding material was dried at 80 °C under vacuum for 5 hours or more, and was injection-molded using a horizontal-type hydraulic injection molding machine with a full-flight screw to produce a molded product with a shape as shown in FIG. 1.

FIG. 1 shows a straight tube 1 through which a fluid to be measured flows from positions 10 to 11. A diaphragm (not shown) is provided in the flow path of the tube 1 in the flow direction. Two positions of the diaphragm in the flow direction are supported by the inner wall of the tube 1 via two supporting members (not shown). A magnetic body (not shown), such as a permanent magnet, is attached to the diaphragm. A vibration exciter 2 is arranged at a position facing the magnetic body. A first vibration detector 3 and a second vibration detector 4 are arranged at an equal distance from each of the respective two supporting members. The first vibration detector 3 and the second vibration detector 4 are arranged symmetrically about the vibration exciter 2.

The two supporting members are arranged at the positions corresponding to the nodes of the first natural mode of vibration when the diaphragm is left to vibrate completely freely.

A vibration excitation circuit 5 is used to activate the vibration exciter 2 to excite the vibration of the diaphragm, and the output signals from the first vibration detector 3 and the second vibration detector 4 are inputted into a phase difference meter 6. The vibration excitation circuit 5 causes the vibration exciter 2 to excite the vibration of the diaphragm at a rate corresponding to the natural frequency of the first bending mode of vibration of the diaphragm when the tube 1 is filled with a fluid. The vibration of the diaphragm is measured as a vibration displacement or a vibration waveform by the first vibration detector 3 and the second vibration detector 4. The phase difference meter 6 feedbacks the signals measured by the first vibration detector 3 and the second vibration detector 4 to the vibration excitation circuit 5 to modulate the vibration excitation frequency so that the output signals from the first vibration detector 3 and the second vibration detector 4 are always maximized. The phase difference meter 6 also measures the phase difference of the output signals from the first vibration detector 3 and the second vibration detector 4, and outputs the measurement results to an arithmetic circuit 7. The arithmetic circuit 7 is capable of calculating the mass flow rate of the fluid to be measured, based on the measurement results from the phase difference meter 6.

A left support 8*a* and a right support 8*b* are provided to support each end of the tube 1 and serve as fixed ends for the vibration. The vibration exciter 2, the first vibration detector 3, and the second vibration detector 4 are supported by a first frame 9*a* connected to the supports 8*a* and 8*b*. A second frame 9*b* arranged symmetrically to the first frame 9*a* about the longitudinal axis 1*a* of the tube 1 is also connected to the supports 8*a* and 8*b*. The vibration exciter 2 is located at the center of the first frame 9*a*, the center being located at an equal distance from the left support 8*a* and the right support 8*b*. The first vibration detector 3 and the second vibration detector 4 are located on the first frame 9*a* and are arranged symmetrically about the vibration exciter 2.

The vibration excitation circuit 5 activates the vibration exciter 2 to excite the vibration of the diaphragm provided in the flow path of the tube 1. When the diaphragm vibrates, the fluid in contact with the diaphragm also vibrates as an added mass. The diaphragm is excited to vibrate at its natural frequency of the first bending mode of vibration that is combined with that of the added mass of the fluid using the vibration excitation circuit 5 and the vibration exciter 2 so that the output signals from the first vibration detector 3 and the second vibration detector 4 are always maximized.

Consequently, when there is no flow of the fluid, the diaphragm vibrates in its first natural bending mode of vibration that has an antinode at the center between the two supporting members, and the vibration waveforms measured at the two points by the first vibration detector 3 and the second vibration detector 4 are in a common mode and have a common amplitude.

When there is a flow of the fluid, since the added mass has a movement speed, the Coriolis force acts on the diaphragm and torsional vibration is applied on the center of the diaphragm, resulting in a phase shift between the vibration waveform detected by the first vibration detector 3 and the vibration waveform detected by the second vibration detector 4. This phase shift is measured by the phase difference meter 6, and the measuring result is inputted into the arithmetic circuit 7 to calculate the mass flow rate of the fluid.

That is, the Coriolis force F applied to the diaphragm is expressed by the equation below, where m is the added mass, ω is the angular velocity of vibration, and V is the movement speed of the fluid.

$$[F] = -2m[\omega]\cdot[V]$$

The added mass m is a function of the density of the fluid, the plane size of the diaphragm, and the natural mode of vibration. In an actual measuring system, the added mass m can be expressed as a function of the density of the fluid based on an experimental constant for a fluid whose density is known. Since in the system of the present invention, the output signals from the first vibration detector 3 and the second vibration detector 4 are feedbacked to the vibration excitation circuit 5 to sweep the frequency so that the vibration amplitude is always maximized, the density of an unknown fluid can be determined from the measuring result of the absolute value of the natural frequency of the first mode of vibration. Therefore, the density of a fluid to be measured and the mass flow rate of the fluid can be determined simultaneously.

The entire tube is not required to vibrate due to the configuration as described above, in which the diaphragm specifically designed to receive the Coriolis force of the fluid in the axial direction of the tube 1 is arranged; the diaphragm is supported at two positions corresponding to the nodes of the first natural mode of vibration when the diaphragm is left to vibrate freely, and the diaphragm is excited to vibrate at its natural frequency of the first bending mode of vibration; the vibration waveforms are detected by the first vibration detector 3 and the second vibration detector 4 that are arranged between the two supporting positions; and the mass flow rate is determined based on the phase shift between the vibration waveforms. Consequently, the mass flowmeter can be made compact and is provided with excellent responsiveness.

The first natural vibration is prevented from being excited by vibration at the supporting positions due to the configuration described above, in which the diaphragm is excited to vibrate by the vibration exciter 2 provided in the exterior of the tube 1 and the magnetic body, such as a permanent magnet, attached to the diaphragm; and the diaphragm has a mass distribution, including the mass of the magnetic body attached to the diaphragm, such that the first moment relative to the supporting positions is zero. Consequently, the mass flowmeter is less susceptible to external vibration.

Key features of the present invention are that when the first vibration detector has a mass m1, the second vibration detector has a mass m2, and the vibration exciter has a mass m3, m3 is larger than a total mass of m1 and m2; and that when M=Mt+m+Mf is established, m=0.4M or less, wherein the first vibration detector has a mass m1, the second vibration detector has a mass m2, the vibration exciter has a mass m3, m is a total mass of m1 and m2 and m3, the tube has a mass Mt, and the fluid flowing the tube has a mass Mf. These features will be described below.

Figure 12:
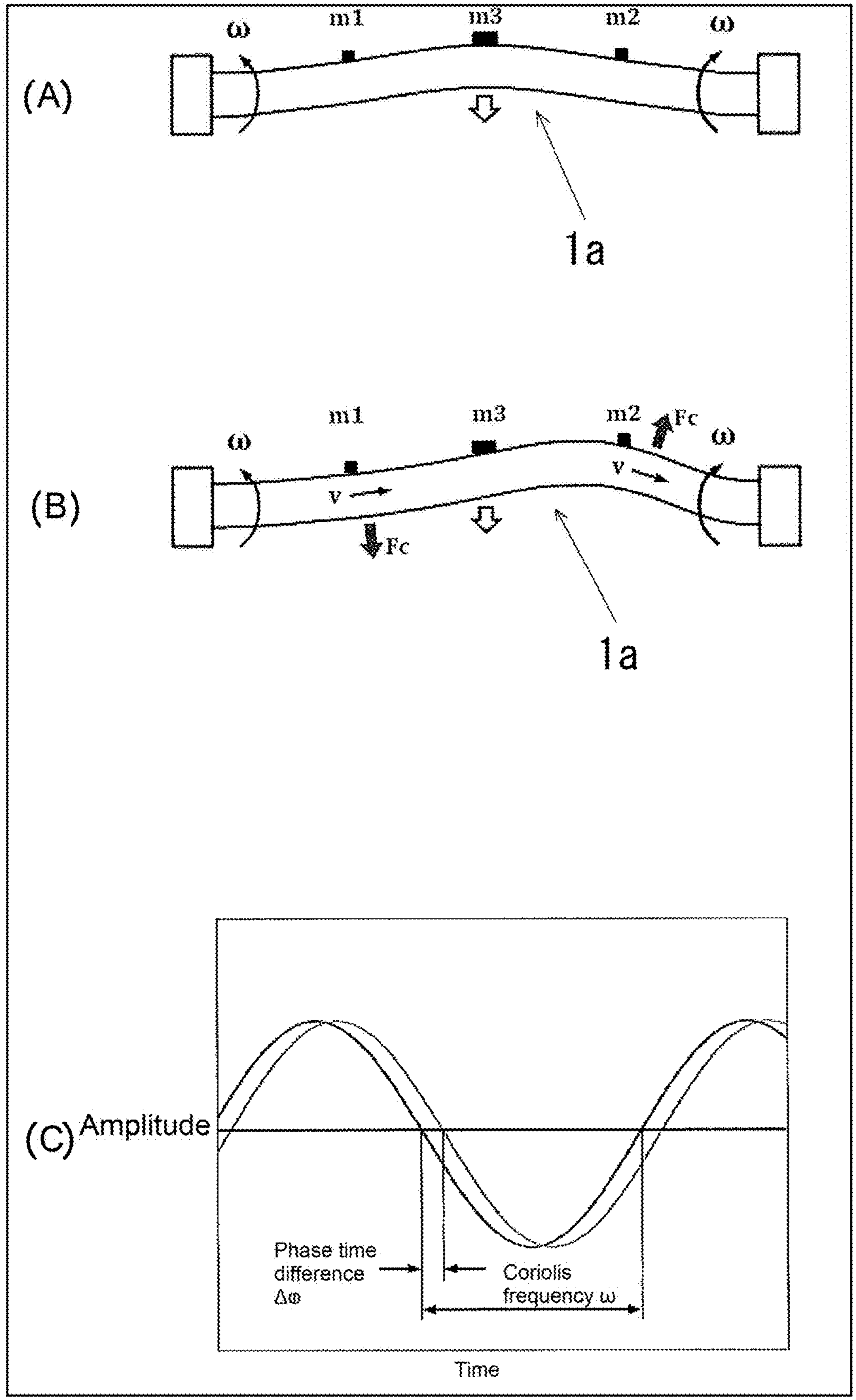
FIGS. 12A and 12B are diagrams showing the operating principle of a straight tube Coriolis mass flowmeter of the present invention.
FIG. 12C shows sinusoidal waveforms detected by the first and second vibration detectors arranged symmetrically about the vibration exciter as shown in FIG. 12B.

As shown in FIGS. 12A and 12B, the phase time difference Δω between the two sinusoidal waveforms outputted from the two vibration detectors, one of which has a mass ml and the other has a mass m2, arranged symmetrically about the vibration exciter having a mass m3 disposed at the center of the tube 1*a* through which a fluid to be measured flows in the Coriolis mass flowmeter, is proportional to the mass flow rate of the fluid that flows at a flow velocity v through the tube 1*a*.

The Coriolis frequency ω of the sinusoidal waveforms and the density ρ are in the relation represented by the following equation:

$$\omega \propto (1/L^2)(EI/\rho A)^{1/2}, \tag{1}$$

where L is the length of the tube 1*a*, E is the modulus of elasticity of the tube 1*a*, I is the second moment of area of the tube 1*a*, and A is the cross-sectional area of the tube 1*a*.

The second moment of area I is expressed by the following equation:

$$I \propto D_O^4 - D_i^4, \tag{2}$$

where $D_O$ is the outer diameter of the tube 1*a*, and $D_i$ is the inner diameter of the tube 1*a*. The second moment of area I is a function of the dimension of the tube 1*a* only.

Since ρA in the denominator in the above equation (1) is the total mass of a unit length of the tube 1*a*, the mass mt per unit length of the tube 1*a* is expressed by the following equation:

$$\rho t \times \pi \times (1/4)(D_O^2 - D_i^2),$$

where ρt is the density of the tube 1*a*, and ρf is the density of the fluid flowing through the tube 1*a*. The mass mf per unit length of the fluid is expressed by the following equation:

$$\rho f \times \pi \times (1/4)(D_i^2).$$

ρA can be replaced with mt+mf.

Therefore, given that the shape and the dimension of the tube 1*a* are constant and the type of the fluid flowing through the tube 1*a* is constant, the Coriolis frequency ω is a function of the modulus of elasticity E and the density ρt only, both of which depend on the material of the tube 1*a*. When the mass of the tube 1*a* is Mt and the mass of the fluid in the tube 1*a* is Mf under the prerequisite that the shape and the dimension of the tube 1*a* are constant, mt and mf can be replaced with Mt and Mf, respectively. Further, the added mass, including the masses m1 and m2 of the vibration detectors and the mass m3 of the vibration exciter, is added to the tube 1*a* regardless of the mass Mt of the tube 1*a* or the mass Mf of the fluid. Thus, the total mass M of the tube 1*a* can be expressed by the following equation:

$$M = Mt + m + Mf.$$

Therefore, the above equation (1) can be expressed as the following equation (3):

$$\omega \propto (EI/M)^{1/2}. \tag{3}$$

Given that the shape, the dimension and the material of the tube 1*a* are constant, a variable within the equation representing the total mass M (Mt+m+Mf) of the tube 1*a* is the mass Mf of the fluid, which is a function of the density ρf. Therefore, according to the above equation (3), the Coriolis frequency ω is deduced to be a function of the density ρf. That is, the infinitesimal amount Δω of the Coriolis frequency ω is deduced to be a function of the infinitesimal amount Δρf of the density of the fluid. In general, the sensitivity of a Coriolis mass flowmeter (also serving as a densimeter) to changes in the density of a fluid (changes in the frequency) is referred to as a margin of the frequency density (Hz/(g/cm$^3$)). A change in the density of a fluid (infinitesimal amount Δρf) can be interpreted as a measurement resolution of the density of a fluid, and a change in a Coriolis frequency ω (infinitesimal amount Δω) can be interpreted as a measurement resolution of a Coriolis frequency. Thus, the sensitivity of the measurement of the density of a fluid can be estimated based on a margin of the frequency density (Hz/(g/cm$^3$)).

In cases where the fluid to be measured is a gas, which is a compressible fluid, the pressure and temperature should be considered constant when comparing different types of gases. Under typical conditions of 1 atmosphere at 0 °C, the density of hydrogen gas is 0.0898 (g/L) and the density of helium gas is 0.1769 (g/L), and the difference in density between them is 0.0871 (g/L). A Coriolis mass flowmeter is required to have a sensitivity to detect such a difference in density.

Described below is a general procedure for detecting the Coriolis frequency ω and the phase time difference Δω between two sinusoidal waveforms outputted from the two vibration detectors as shown in FIG. 12C. Referring back to FIG. 1, output signals from the first vibration detector 3 and the second vibration detector 4 are inputted into the phase difference meter 6. The phase difference meter 6 is composed of a preamplifier and an analog-to-digital conversion circuit. The output signals are converted into digital signals in the phase difference meter 6, and then computed with a software in the arithmetic circuit 7 to determine the phase time difference Ap and the Coriolis frequency ω. Therefore, in general, the resolution of detection of the phase time difference Ap and the Coriolis frequency ω are restricted by the resolution of analog-to-digital conversion by the phase difference meter 6 and the resolution of fast Fourier transformation by the arithmetic circuit 7.

In general, the Coriolis frequency ω is dictated by the shape, the dimension, etc. of a tube through which a fluid to be measured flows and is about 100 Hz to 1 kHz. In contrast to the frequency range, the resolution of analog-to-digital conversion by the phase difference meter 6 at an appropriate price and the resolution bandwidth of fast Fourier transformation by the arithmetic circuit 7 is generally about 1 mHz. Based on these estimations, when the frequency resolution is 1 mHz, the measurement resolution of the density of a fluid is $\Delta\rho=0.0871$ (g/L)=0.0871 (mg/$cm^3$) and the measurement resolution of the Coriolis frequency is $\Delta\omega=1$ mHz, and then a margin of the frequency density can be calculated as follows: $\Delta\omega/\Delta\rho=1$ (mHz)/0.0871 (mg/$cm^3$)=11.5 (Hz/(g/$cm^3$)). When the margin is estimated considering that the precision of measurement is 4-to 5-fold of the measurement resolution of the Coriolis frequency, the margin of the frequency density will be 46 to 58 Hz/(g/$cm^3$).

Figure 13:
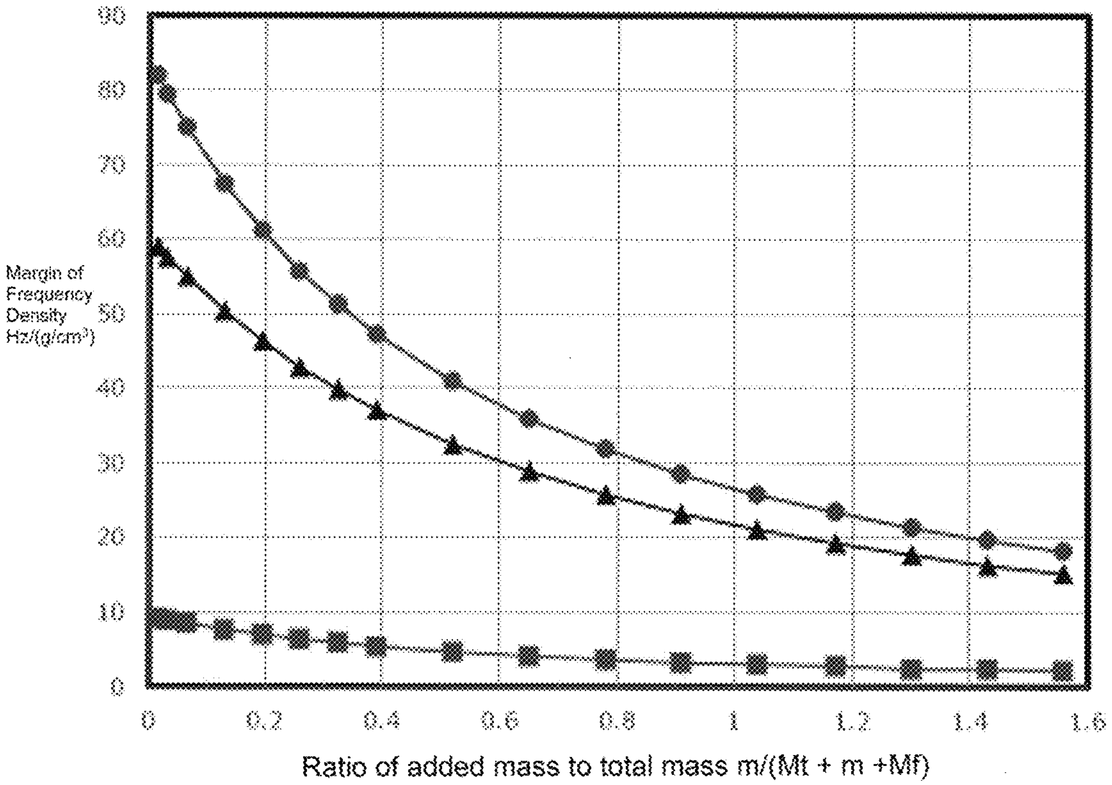
FIG. 13 shows a graph of the ratio of the added mass m (m1+m2+m3) to the total mass M (Mt+m+Mf) of the tube plotted on the horizontal axis against the margin of the frequency density (Hz/(g/cm$^3$)) on the vertical axis. In this plot, m3=m1+m2, and the material of the tube is CFRTP (●), SUS316 (▲) or PFA (■).
Figure 14:
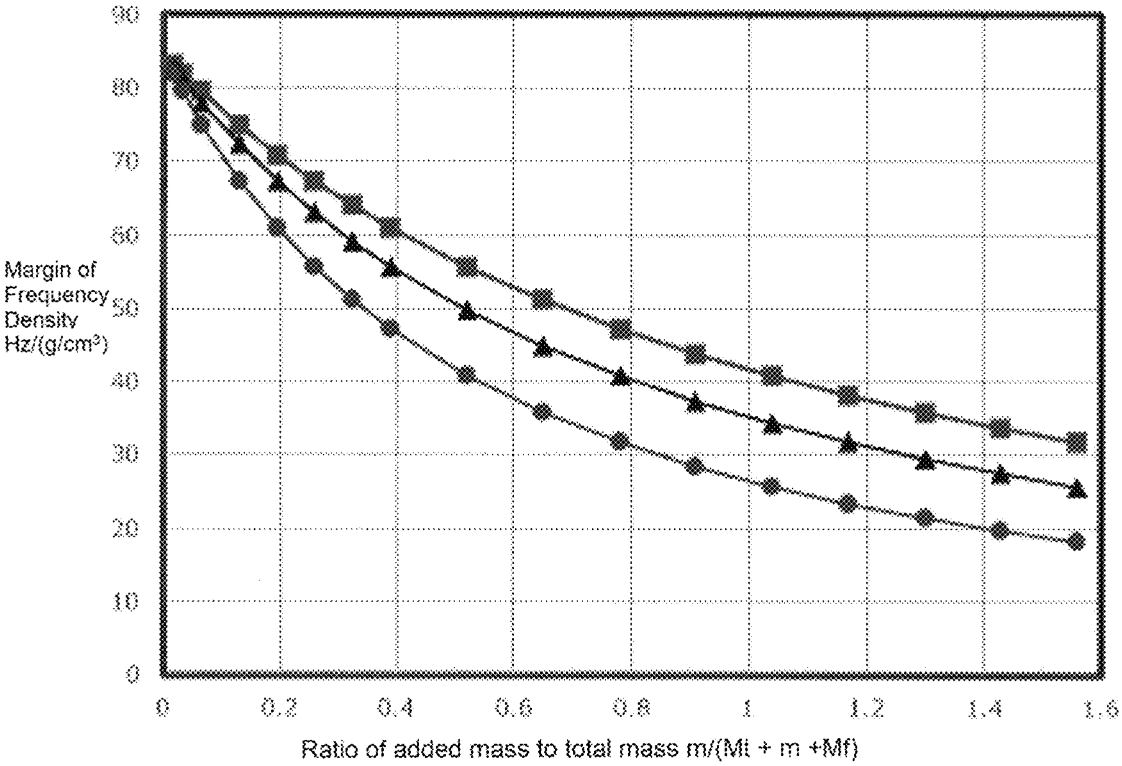
FIG. 14 shows a graph of the ratio of the added mass m (m1+m2+m3) to the total mass M (Mt+m+Mf) of the tube plotted on the horizontal axis against the margin of the frequency density (Hz/(g/cm$^3$)) on the vertical axis. In this plot, the material of the tube is CFRTP. The symbols "■", "▲" and "●" indicate cases where the ratio m3/(m1+m2) is 3/1, 2/1, and 1/1, respectively, and where the first vibration detector has a mass m1, the second vibration detector has a mass m2, and the vibration exciter has a mass m3.

FIG. 13 shows a graph of the ratio of the added mass m (m1+m2+m3) to the total mass M (Mt+m+Mf) of the tube plotted on the horizontal axis against the margin of the frequency density (Hz/(g/$cm^3$)) on the vertical axis. In this plot, m3=m1+m2, where the first vibration detector has a mass m1, the second vibration detector has a mass m2,the vibration exciter has a mass m3, the tube has a mass Mt, and the fluid flowing the tube has a mass Mf. The material of the tube is CFRTP (●), SUS316 (▲) or PFA (■). FIG. 14 shows a graph of the ratio of the added mass m (m1+m2+m3) to the total mass M (Mt+m+Mf) of the tube plotted on the horizontal axis against the margin of the frequency density (Hz/(g/$cm^3$)) on the vertical axis. In this plot, the material of the tube is CFRTP. The symbols "■", "▲", and "●" indicate cases where the ratio m3/(m1+m2) is 3/1, 2/1,and 1/1, respectively, and where the first vibration detector has a mass m1, the second vibration detector has a mass m2, and the vibration exciter has a mass m3.

The density (g/$cm^3$), the modulus of elasticity (GPa) and the coefficient of linear expansion ($10^{-6}$/°C) of the CFRTP (carbon fiber reinforced fluororesin), PFA, and SUS316 used in FIGS. 13 and 14 are shown in Table 1 below. In FIGS. 13 and 14, the conditions other than the material of the tube are the same, including the shape and the dimension of the tube, and the installed positions of the vibration exciter and the vibration detectors. Since the measurement of a very small flow rate is intended, the outer and inner diameters of the tube used for calculation are 1.057 mm and 0.794 mm, respectively. The mass of the tube is small, and thus when the ratio of the added mass m to the total mass M is large, a high degree of design freedom can be achieved. In general, a vibration exciter is required to be supplied with energy to excite the vibration of a tube at its resonant frequency, and the vibration exciter may be an electromagnetic coil or the like, which inevitably adds some mass. On the other hand, the vibration detectors may be a passive vibration sensor, which is not heavy in weight like an electromagnetic coil. The vibration detectors may be an AE sensor using a piezoelectric element, an optical displacement sensor, or the like that can be reduced in weight, which can in turn reduce the added mass.

TABLE 1

| | Density | Modulus of elasticity | Coefficient of linear expansion |
|---|---|---|---|
| CFRTP | 1.60 | 32 | 1.0 |
| PFA | 2.15 | 0.67 | 120 |
| SUS316 | 7.98 | 193 | 16 |

As shown in FIG. 13, when the tube is made of PFA, an adequate margin of the frequency density cannot be obtained. This result implies the reason why no mention has been made in the conventional art as to the measurement of the density for a PFA tube used as a tube through which a fluid to be measured flows. When the tube is made of SUS316, which is commonly used as a material of the tube, the mass m should be designed to be m=0.2M or less to obtain an adequate margin of the frequency density. When CFRTP is used as a material of the tube, the mass m can be m=0.4M or less to obtain an adequate margin of the frequency density.

When the shape and the dimension (the length, the outer diameter, and the inner diameter) of the tube through which a fluid to be measured flows are constant, the Coriolis frequency ω represented by equation (3) is a function of the modulus of elasticity E and the total mass M (=Mt+m+Mf) of the tube only, as represented by the following equation (4):

$$\omega \propto (E/M)^{1/2}. \tag{4}$$

Further, when the density of the fluid is constant, Mf is a constant. Mt is a function of the density ρt of the tube only, and when the properties of the material of the tube are constant, the modulus of elasticity E and Mt are constants. Therefore, by focusing on the denominator, equation (4) can be rewritten as follows:

$$\omega \propto (Mt+m+Mf)^{-1/2}. \tag{5}$$

Hence, from equation (5), the shift of ω (Δω) is assumed to vary with the ratio m/(Mt+m+Mf).

The added mass m, which is the sum total of the mass m3 of the vibration exciter and the mass m1 and m2 of the vibration detectors, is usually designed as m1=m2, and can also be expressed as m=m3+2×m1.

The vibration exciter is disposed at the center of the tube and used to excite the vibration of the tube as shown in FIG. 12A. When a fluid flows through the tube, torsional vibration induced by the Coriolis force occurs around the vibration exciter serving as the center of the rotation axis in the tube as shown in FIG. 12B. At that time, the mass m3 of the vibration exciter on the rotation axis of the torsional vibration does not contribute to the moment of inertia of the torsional vibration, and only the masses of the vibration detectors (m1+m2) are added to the moment of inertia of the torsional vibration. The moment of inertia added to the torsional vibration affects the frequency of the torsional vibration. This frequency of the torsional vibration is the Coriolis frequency, and the shift of the Coriolis frequency Ao depends on the ratio of the masses of the vibration detectors (m1+m2) to the added mass m. Therefore, when the ratio m/(Mt+m+Mf) is a given value, the margin of the frequency density will vary with changes in the ratio m3/(m1+m2), as shown in FIG. 14.

As shown in FIG. 14, when the margin of the frequency density is 46 mHz/(g/cm$^3$), where the first vibration detector has a mass m1, the second vibration detector has a mass m2, and the vibration exciter has a mass m3, the ratio of the added mass m to the total mass M (=Mt+m+Mf) is m=0.4M or less at the ratio m3/(m1+m2)=1, or m=0.6M or less at the ratio m3/(m1 +m2) =2, or m =0.8M or less at the ratio m3/(m1 +m2) =3.

Also as shown in FIG. 14, when m =0.4M at the ratio m3/(m1 +m2) =2, the margin of the frequency density is 55 Hz/(g/cm$^3$), and when m =0.4M at the ratio m3/(ml +m2) =3, the margin of the frequency density is 61 Hz/(g/cm$^3$). Therefore, when the ratio m3/(m1+m2) is set to be larger than 1, the margin of the frequency density can be improved (in this way, a high degree of design freedom of the vibration exciter and the vibration detectors can be achieved).

Figure 15:
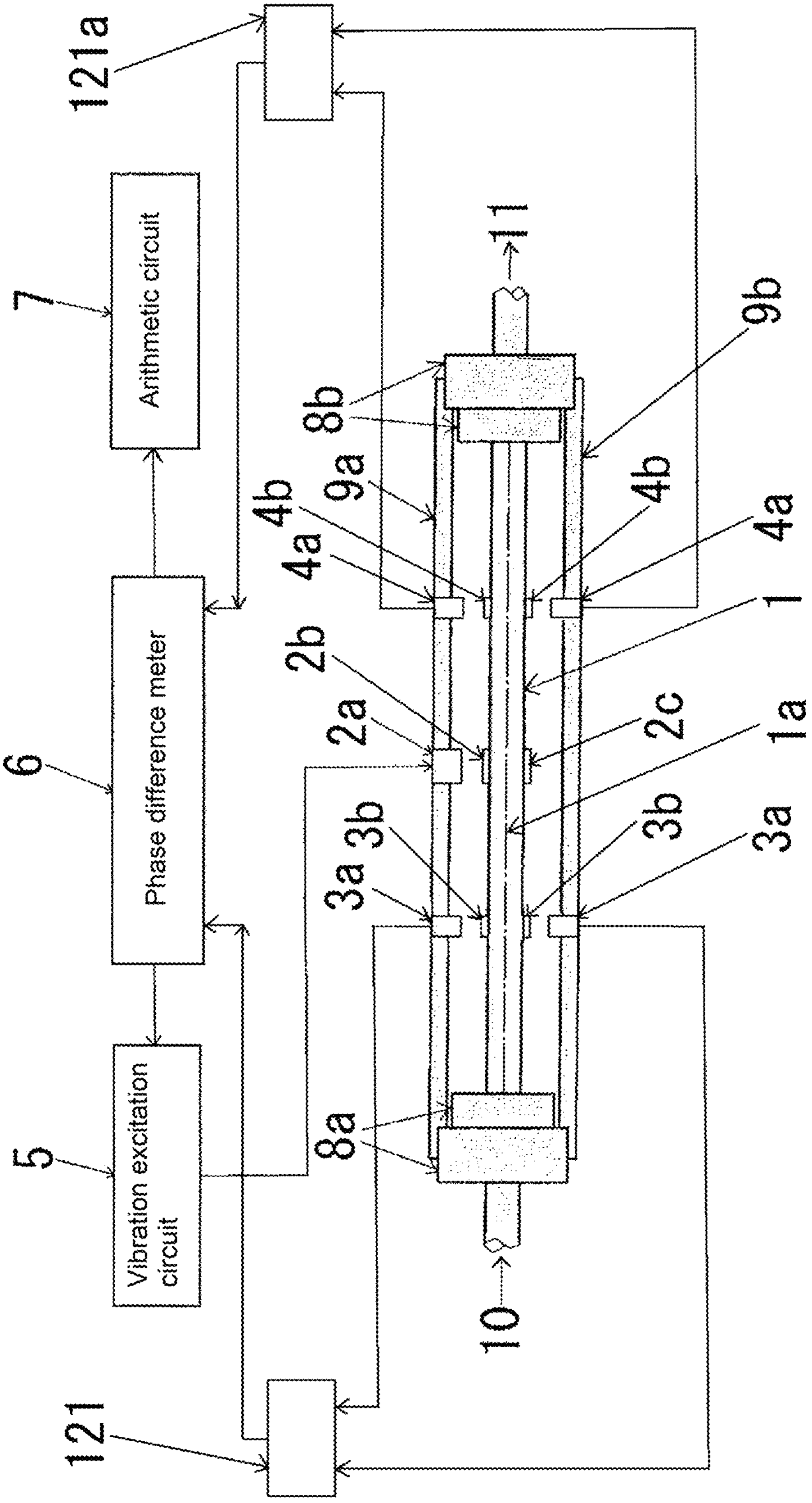
FIG. 15 is a schematic configuration diagram of a second example of the Coriolis mass flowmeter of the present invention including related components.

FIG. 15 is a schematic configuration diagram of a second example of the Coriolis mass flowmeter of the present invention including related components. The second example includes a first differential circuit 121 and a second differential circuit 121*a*. The second example also includes, on a first frame 9*a*, an electromagnetic drive coil 2*a* serving as a vibration exciter (which corresponds to a magnetic body, such as a permanent magnet, as described below), and capacitive sensors serving as a first vibration detector 3*a* and a second vibration detector 4*a*. The electromagnetic drive coil 2*a* is located at the center of the first frame 9*a*, the center being located at an equal distance from a left support 8*a* and a right support 8*b*. The first vibration detector 3*a* and the second vibration detector 4*a* are located on the first frame 9*a* and are arranged symmetrically about the electromagnetic drive coil 2*a*. Additional capacitive sensors serving as a first vibration detector 3*a* and a second vibration detector 4*a* are supported by a second frame 9*b* so that the additional capacitive sensors are arranged symmetrically to the first vibration detector 3*a* and the second vibration detector 4*a* supported by the first frame 9*a* about the longitudinal axis 1*a* of a tube 1. The second example also includes, on the tube 1, a magnetic body 2*b*, such as a permanent magnet, serving as a vibration exciter, and a non-magnetic body 2*c* having a shape and a mass identical to those of the magnetic body 2*b*, and the non-magnetic body 2*c* is arranged symmetrically to the magnetic body 2*b* about the longitudinal axis 1*a* of the tube 1. The second example further includes metallic thin films 3*b*, 4*b*. In such a configuration where the first differential circuit 121 for computing the difference between outputs from the first vibration detectors 3*a* arranged symmetrically about the longitudinal axis 1*a* of the tube 1*a* is provided, and the second differential circuit 121*a* for computing the difference between outputs from the second vibration detectors 4*a* arranged symmetrically about the longitudinal axis 1*a* of the tube 1*a* is provided, the phase difference between outputs from the differential circuits 121, 121*a* can be measured to reject a common mode signal, such as external vibration.

Here, when the first vibration detectors have a mass m1, the second vibration detectors have a mass m2, and the vibration exciter has a mass m3, m3 is larger than the total mass of m1 and m2. When the first vibration detector 3*a* supported by the first frame 9*a* and the additional first vibration detector 3*a* supported by the second frame 9*b* each have a mass of m1/2; the second vibration detector 4*a* supported by the first frame 9*a* and the additional second vibration detector 4*a* supported by the second frame 9*b* each have a mass of m2/2; and the magnetic body 2*b* and the non-magnetic body 2*c* each have a mass of m3/2, equal masses are arranged symmetrically about the longitudinal axis 1*a* of the tube 1, and equal moments of inertia are generated symmetrically about the longitudinal axis 1*a* of the tube 1. In this manner, by providing equal, symmetrical moments of inertia in the direction of vibration of the tube 1, the vibration symmetrical about the axis is generated, and common-mode vibration components can be rejected by computing the difference between the outputs.

Figure 16:
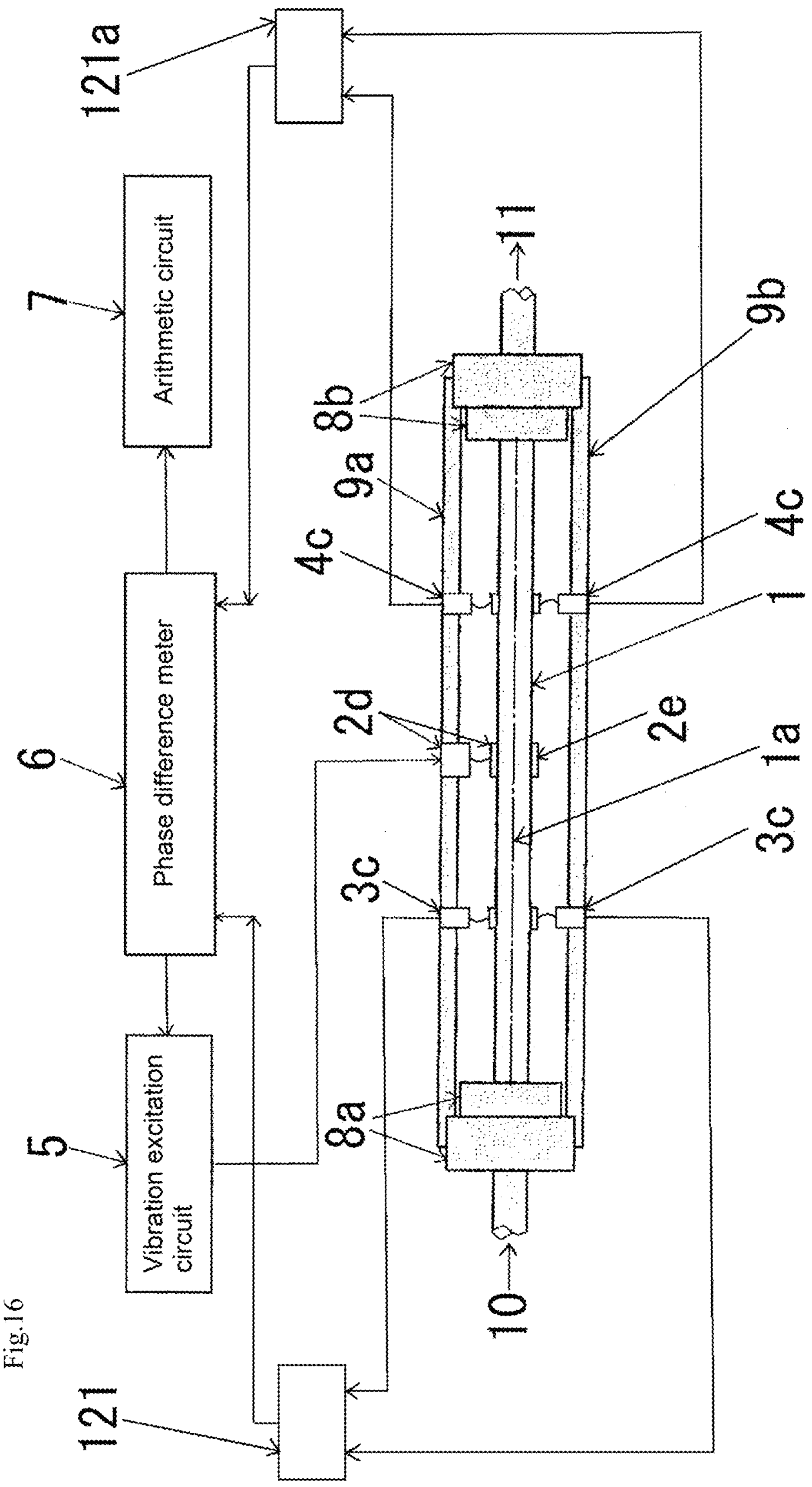
FIG. 16 is a schematic configuration diagram of a third example of the Coriolis mass flowmeter of the present invention including related components.

FIG. 16 is a schematic configuration diagram of a third example of the Coriolis mass flowmeter of the present invention including related components. The third example includes a first differential circuit 121 and a second differential circuit 121*a*. The third example also includes, on a first frame 9*a*, a piezoelectric element 2*d* serving as a vibration exciter, and acoustic sensors serving as a first vibration detector 3*c* and a second vibration detector 4*c*. The piezoelectric element 2*d* is located at the center of the first frame 9*a*, the center being located at an equal distance from a right support 9*a* and a left support 9*b*. The first vibration detector 3*c* and the second vibration detector 4*c* are located on the first frame 9*a* and are arranged symmetrically about the piezoelectric element 2*d*. Additional acoustic sensors serving as a first vibration detector 3*c* and a second vibration detector 4*c* are supported by a second frame 9*b* so that the additional acoustic sensors are arranged symmetrically to the first vibration detector 3*c* and the second vibration detector 4*c* supported by the first frame 9*a* about the longitudinal axis 1*a* of a tube 1. An equivalent mass 2*e* is also disposed on the tube 1.

Figure 17:
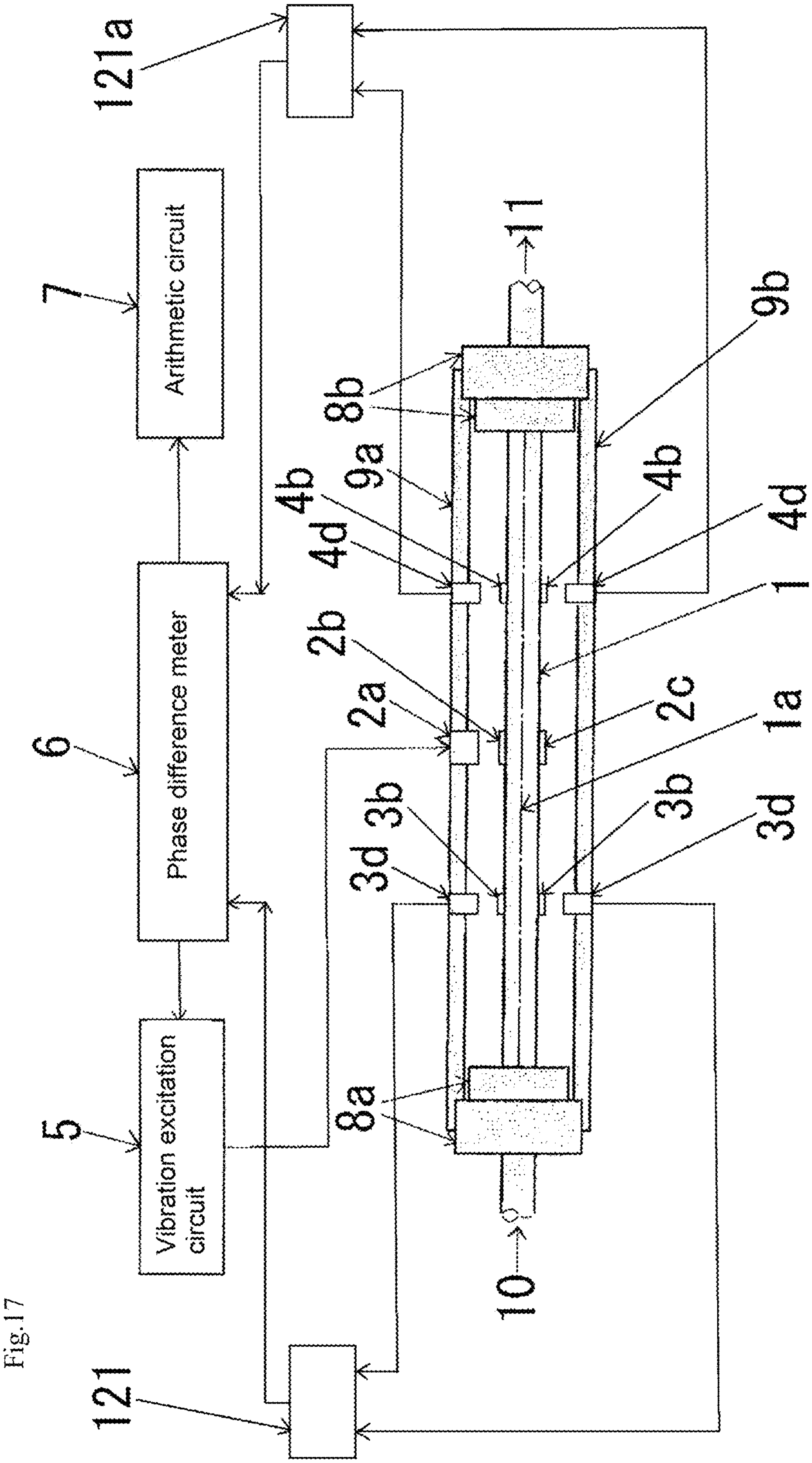
FIG. 17 is a schematic configuration diagram of a fourth example of the Coriolis mass flowmeter of the present invention including related components.

FIG. 17 is a schematic configuration diagram of a fourth example of the Coriolis mass flowmeter of the present invention including related components. The fourth example includes a first differential circuit 121 and a second differential circuit 121*a*. The fourth example also includes, on a first frame 9*a*, an electromagnetic drive coil 2*a* serving as a vibration exciter, and optical displacement sensors serving as a first vibration detector 3*d* and a second vibration detector 4*d*. The electromagnetic drive coil 2*a* is located at the center of the first frame 9*a*, the center being located at an equal distance from a right support 9*a* and a left support 9*b*. The first vibration detector 3*d* and the second vibration detector 4*d* are located on the first frame 9*a* and are arranged symmetrically about the electromagnetic drive coil 2*a*. Additional optical displacement sensors serving as a first vibration detector 3*d* and a second vibration detector 4*d* are supported by a second frame 9*b* so that the additional optical displacement sensors are arranged symmetrically to the first vibration detector 3*d* and the second vibration detector 4*d* supported by the first frame 9*a* about the longitudinal axis 1*a* of a tube 1. The fourth example also includes, on the tube 1, a magnetic body 2*b* serving as a vibration exciter, and a non-magnetic body 2*c* having a shape and a mass identical to those of the magnetic body 2*b*, and the non-magnetic body 2*c* is arranged symmetrically to the magnetic body 2*b* about the longitudinal axis 1*a* of the tube 1. The fourth example also includes metallic thin films 3*b*, 4*b*.

Figure 18:
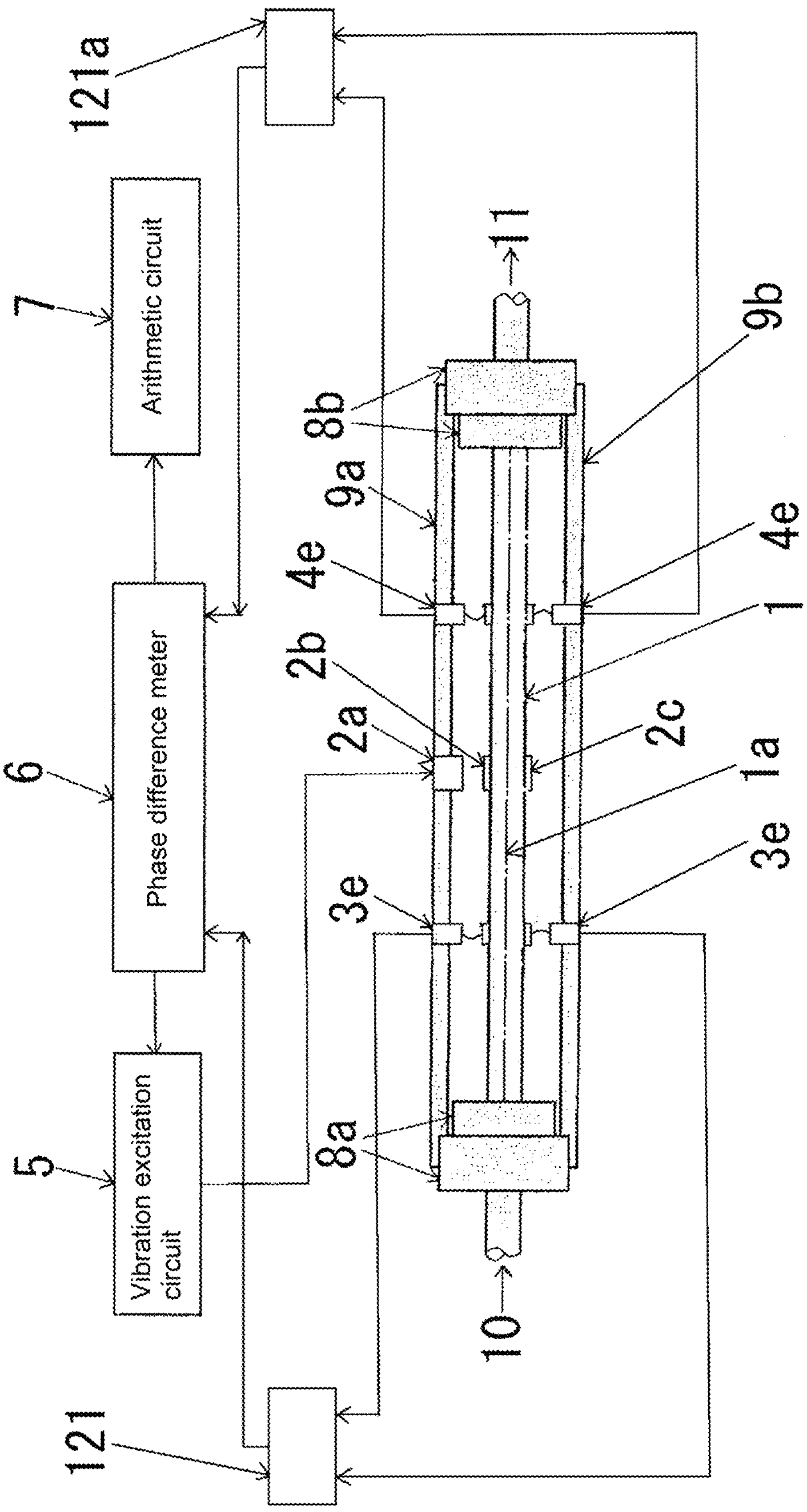
FIG. 18 is a schematic configuration diagram of a fifth example of the Coriolis mass flowmeter of the present invention including related components.

FIG. 18 is a schematic configuration diagram of a fifth example of the Coriolis mass flowmeter of the present invention including related components. The fifth example includes a first differential circuit 121 and a second differential circuit 121*a*. The fifth example also includes, on a first frame 9*a*, an electromagnetic drive coil 2*a* serving as a vibration exciter, and acceleration sensors serving as a first vibration detector 3*e* and a second vibration detector 4*e*. The electromagnetic drive coil 2*a* is located at the center of the first frame 9*a*, the center being located at an equal distance from a right support 9*a* and a left support 9*b*. The first vibration detector 3*e* and the second vibration detector 4*e* are located on the first frame 9*a* and are arranged symmetrically about the electromagnetic drive coil 2*a*. Additional acceleration sensors serving as a first vibration detector 3*e* and a second vibration detector 4*e* are supported by a second frame 9*b* so that the additional acceleration sensors are arranged symmetrically to the first vibration detector 3*e* and the second vibration detector 4*e* supported by the first frame 9*a* about the longitudinal axis 1*a* of a tube 1. The fifth example also includes, on the tube 1, a magnetic body 2*b* serving as a vibration exciter, and a non-magnetic body 2*c* having a shape and a mass identical to those of the magnetic body 2*b*, and the non-magnetic body 2*c* is arranged symmetrically to the magnetic body 2*b* about the longitudinal axis 1*a* of the tube 1.

REFERENCE SIGNS LIST

1 Tube
2, 2*a*, and 2*d* Vibration exciter
2*b* Magnetic body such as a permanent magnet
2*c* Non-magnetic body
2*e* Equivalent mass
3, 3*a*, 3*c*, 3*d*, and 3*e* First vibration detector
3*b* Metallic thin film
4, 4*a*, 4*c*, 4*d*, and 4*e* Second vibration detector
4*b* Metallic thin film
5 Vibration excitation circuit
6 Phase difference meter
7 Arithmetic circuit
8*a* Right support
8*b* Left support
9*a* First frame
9*b* Second frame
121 First differential circuit
121*a* Second differential circuit

The invention claimed is:

1. A Coriolis mass flowmeter comprising
a straight tube through which a fluid to be measured flows;
a vibration exciter for exciting the tube to vibrate;
first and second vibration detectors for detecting the vibration of the tube; and
supports for supporting each end of the tube to serve as fixed ends for the vibration;
wherein the vibration exciter and the first and second vibration detectors are supported by a frame connected to the supports;
wherein a mass flow rate of the fluid flowing through the tube is determined based on a phase shift of vibration waveforms detected by the first and second vibration detectors;
wherein the tube, the supports and the frame are made of a carbon fiber reinforced fluororesin;
wherein when M=Mt+m+Mf is established, m3 is larger than a total mass of m1 and m2, and m is not more than 0.4M when the ratio of m3/(m1+m2) equals 1, and m is not more than 0.6M when the ratio of m3/(m1+m2) equals 2, and m is not more than 0.8M when the ratio of m3/(m1+m2) equals 3, wherein the first vibration detector has a mass m1, the second vibration detector has a mass m2, the vibration exciter has a mass m3, m is a total mass of m1 and m2 and m3, the tube has a mass Mt, and the fluid flowing the tube has a mass Mf.

2. The Coriolis mass flowmeter according to claim 1, wherein the volumetric amount of the carbon fibers in the carbon fiber reinforced fluororsin is 20 to 40%.

3. The Coriolis mass flowmeter according to claim 2, wherein the first and second vibration detectors are acceleration sensors arranged symmetrically about the vibration exciter.

4. The Coriolis mass flowmeter according to claim 2, wherein the first and second vibration detectors are acoustic sensors arranged symmetrically about the vibration exciter.

5. The Coriolis mass flowmeter according to claim 2, wherein the first and second vibration detectors are capacitive sensors, and wherein a metallic thin film is attached to the tube.

6. The Coriolis mass flowmeter according to claim 2, wherein the first and second vibration detectors are optical displacement sensors, and wherein a metallic thin film is attached to the tube.

7. The Coriolis mass flowmeter according to claim 3, wherein the vibration exciter is a piezoelectric element.

8. The Coriolis mass flowmeter according to claim 4, wherein the vibration exciter is a piezoelectric element.

* * * * *